United States Patent
Sardes et al.

(10) Patent No.: US 12,179,862 B2
(45) Date of Patent: Dec. 31, 2024

(54) VEHICLE CORNER MODULES AND SYSTEMS AND METHODS FOR INSTALLATION THEREOF

(71) Applicant: REE AUTOMOTIVE LTD., Kibbutz Glil-Yam (IL)

(72) Inventors: Ahishay Sardes, Tel Aviv (IL); Zohar Goldenstein, Nes-Tziyona (IL); Amit Aknin, Karkom (IL); Eylon Avigur, Ramat Gan (IL); Gal Zohar, Kibbutz Ein-Shemer (IL); Michael Oisgeld, Tel Aviv (IL); Tomer Schindler, Tel Aviv (IL); Ran Dekel, Nofit (IL); Tomer Segev, Nofit (IL); Eran Starik, Tel Aviv (IL)

(73) Assignee: REE AUTOMOTIVE LTD, Kibbutz Glil Yam (IL)

( * ) Notice: Subject to any disclaimer, the term of this patent is extended or adjusted under 35 U.S.C. 154(b) by 0 days.

(21) Appl. No.: 18/563,941

(22) PCT Filed: Jun. 2, 2022

(86) PCT No.: PCT/IB2022/055174
§ 371 (c)(1),
(2) Date: Dec. 4, 2023

(87) PCT Pub. No.: WO2022/254382
PCT Pub. Date: Dec. 8, 2022

(65) Prior Publication Data
US 2024/0262438 A1   Aug. 8, 2024

Related U.S. Application Data

(63) Continuation of application No. 17/555,459, filed on Dec. 19, 2021, now Pat. No. 11,465,699.
(Continued)

(51) Int. Cl.
*B62D 63/02* (2006.01)
*B60R 16/023* (2006.01)
(Continued)

(52) U.S. Cl.
CPC ........ *B62D 63/025* (2013.01); *B60R 16/0231* (2013.01); *B60R 16/08* (2013.01); *B62D 65/12* (2013.01)

(58) Field of Classification Search
CPC .... B62D 63/025; B62D 65/12; B62D 65/024; B62D 65/04; B62D 65/02; B60R 16/0231; B60R 16/08
See application file for complete search history.

(56) References Cited

U.S. PATENT DOCUMENTS

| 2,678,830 A | 5/1954 | Andrew |
| 4,951,964 A | 8/1990 | Sakamoto |

(Continued)

FOREIGN PATENT DOCUMENTS

| CA | 2463044 A1 * | 10/2005 | ................ B60P 1/00 |
| CN | 116141951 A * | 5/2023 | ............... B60G 3/00 |

(Continued)

OTHER PUBLICATIONS

International search report for PCT/IB2022/055174 mail-date Nov. 3, 2022.
Written Opinion for PCT/IB2022/055174 mail-date Nov. 3, 2022.

*Primary Examiner* — Paul N Dickson
*Assistant Examiner* — Matthew D Lee
(74) *Attorney, Agent, or Firm* — Momentum IP; Marc Van Dyke

(57) ABSTRACT

Vehicle corner modules (VCMs) connectable to a VCM-connection interface of a reference-frame of a vehicle platform, for regulating motion of a vehicle. When a wheel is mounted on a wheel-hub assembly of the VCM, a vehicle- (Continued)

connection interface of the VCM is disposed within a cylindrical footprint of the wheel. At least one of the at least one subsystem of the VCM is accommodated between the wheel-hub assembly and the vehicle-connection interface. Vehicle platforms are connectable to the VCMs. The connection of the vehicle platform to the VCM may include connection of subsystems of the VCM to electronic or flow subsystems mounted on the vehicle platform by connection of two portions of a multi-interface connection-element.

20 Claims, 18 Drawing Sheets

Related U.S. Application Data

(60) Provisional application No. 63/196,700, filed on Jun. 4, 2021.

(51) Int. Cl.
    *B60R 16/08*     (2006.01)
    *B62D 65/12*     (2006.01)

(56) References Cited

U.S. PATENT DOCUMENTS

| | | | | |
|---|---|---|---|---|
| 6,267,387 | B1 | 7/2001 | Weiss | |
| 6,874,816 | B2 | 4/2005 | Herrmann | |
| 8,534,411 | B2 | 9/2013 | Hirai | |
| 9,085,302 | B2 | 7/2015 | Borroni-Bird | |
| 10,668,926 | B2 | 6/2020 | Birnschein | |
| 10,919,575 | B1 | 2/2021 | Sardes | |
| 11,180,207 | B2 | 11/2021 | Sardes | |
| D944,684 | S | 3/2022 | Aknin | |
| 11,260,714 | B2 | 3/2022 | Thoreson | |
| 11,260,909 | B2 | 3/2022 | Sardes | |
| 11,267,283 | B2 * | 3/2022 | Hsu | B60G 17/0157 |
| 11,267,522 | B2 | 3/2022 | Sardes | |
| 11,285,994 | B2 | 3/2022 | Gordon | |
| 11,465,699 | B1 | 10/2022 | Sardes | |
| 11,608,114 | B2 | 3/2023 | Sardes | |
| 11,891,138 | B2 | 2/2024 | Sardes | |
| 2003/0132584 | A1 * | 7/2003 | Borroni-Bird | B60G 17/015 280/124.1 |
| 2003/0227165 | A1 | 12/2003 | Herrmann | |
| 2007/0199748 | A1 * | 8/2007 | Ross | B60K 7/0007 180/65.51 |
| 2010/0116572 | A1 * | 5/2010 | Schmitt | B62D 9/002 701/22 |
| 2012/0267185 | A1 | 10/2012 | Hirai | |
| 2014/0138941 | A1 | 5/2014 | Lin | |
| 2015/0083508 | A1 * | 3/2015 | Bluethmann | B62D 5/0418 180/204 |
| 2015/0083509 | A1 * | 3/2015 | Borroni-Bird | B60W 10/08 180/204 |
| 2018/0345777 | A1 | 12/2018 | Birnschein | |
| 2018/0345971 | A1 * | 12/2018 | Birnschein | B62D 21/152 |
| 2019/0232504 | A1 * | 8/2019 | Radetzki | B25J 19/005 |
| 2020/0239069 | A1 | 7/2020 | Gordon | |
| 2021/0197897 | A1 | 7/2021 | Sardes | |
| 2021/0245797 | A1 * | 8/2021 | Sardes | B60G 3/01 |
| 2021/0268854 | A1 | 9/2021 | Thoreson | |
| 2021/0284262 | A1 | 9/2021 | Sardes | |
| 2021/0394846 | A1 | 12/2021 | Sardes | |
| 2022/0126918 | A1 | 4/2022 | Sardes | |
| 2022/0204078 | A1 * | 6/2022 | Aknin | B60G 7/006 |

FOREIGN PATENT DOCUMENTS

| | | | | |
|---|---|---|---|---|
| CN | 116767390 A * | 9/2023 | | |
| DE | 102019125792 A1 | 3/2021 | | |
| EP | 4209366 A1 * | 7/2023 | | B60G 13/04 |
| EP | 4286247 A1 * | 12/2023 | | B60G 3/00 |
| KR | 20240051593 A * | 4/2024 | | |
| WO | WO-2019231370 A1 * | 12/2019 | | B60P 3/42 |
| WO | WO-2020130905 A1 * | 6/2020 | | A62C 27/00 |
| WO | 2021/137194 A1 | 7/2021 | | |
| WO | WO-2023027720 A1 * | 3/2023 | | B60B 35/005 |

* cited by examiner

VEHICLE CORNER MODULES AND SYSTEMS AND METHODS FOR INSTALLATION THEREOF

RELATED APPLICATION

The present application gains priority from U.S. Provisional Patent Application No. 63/196,700 filed on Jun. 4, 2021, which is incorporated herein by reference in its entirety. The present application is a continuation of U.S. patent application Ser. No. 17/555,459, filed on Dec. 19, 2021, which is incorporated herein by reference in its entirety.

FIELD OF THE INVENTION

The present invention relates to Vehicle Corner Modules (VCMs) for regulating the motion of a vehicle, and particularly to systems and methods for installing the VCMs on a reference frame, or platform, of the vehicle.

BACKGROUND OF THE INVENTION

With the future of automotive ownership becoming less privately-owned and more fleet-based and shared-mobility based, maintenance of such future vehicles is becoming a major factor in the profitability of vehicle fleets. Vehicle platforms designed for electric propulsion can include axleless wheel assemblies, which have independent suspension, drivetrain, braking and steering subsystems between wheel assemblies assembled on a platform of the vehicle.

Connection or removal of the subsystems associated with the wheel assemblies to and of the vehicle platform can be a complex and specialized job.

There is therefore a need for systems and methods for simple and quick installation and removal of one or more wheel assemblies on and off a reference frame of a vehicle.

SUMMARY OF EMBODIMENTS OF THE INVENTION

Some embodiments of the invention relate to methods and systems for installing the VCMs on a reference frame, or platform, of the vehicle. These include various interfaces for installing the VCMs on the reference frames, as well as specialized connectors simplifying the installation of the VCMs.

There is thus provided, in accordance with an embodiment of the teachings herein, a vehicle corner module (VCM) connectable to a VCM-connection interface of a reference-frame of a vehicle platform, for regulating motion of a vehicle, the VCM including:
- a sub-frame including a vehicle-connection interface for reversible mechanical connection of the VCM to the VCM-connection interface of the reference frame;
- a wheel-hub assembly including a wheel-hub adapted for mounting of a wheel thereon; and
- at least one subsystem of the vehicle, mounted onto the sub-frame, the at least one subsystem being selected from the group of subsystems consisting of a drive subsystem, a steering subsystem, a suspension subsystem, and a braking subsystem,
wherein, when a wheel is mounted on the wheel-hub assembly, the vehicle-connection interface is disposed within a cylindrical footprint of the wheel, and wherein at least one of the at least one subsystem is accommodated between the wheel-hub assembly and the vehicle-connection interface.

In some embodiments, when the sub-frame is connected to the reference-frame by engagement of the vehicle-connection interface with the VCM-connection interface, the vehicle-connection interface is disposed between the wheel and the reference-frame.

In some embodiments, when the sub-frame is connected to the reference-frame by engagement of the vehicle-connection interface with the VCM-connection interface, the vehicle-connection interface is disposed at a height between a height of an upper surface of the reference-frame and a height of a lower surface of the reference-frame.

In some embodiments, the vehicle further includes at least one power supply, and the VCM further includes at least one connector for connection to the at least one power supply, such that, when the VCM is connected to the vehicle, the at least one power supply powers the at least one subsystem.

In some embodiments, the at least one subsystem includes at least one of a subsystem disposed between the wheel-hub assembly and the vehicle-connection interface, and a subsystem mounted onto a portion of the sub-frame adapted, when the sub-frame is connected to the reference-frame, to be disposed within the reference frame, between upper and lower surfaces of the reference frame.

In some embodiments, all of the subsystems in the plurality of subsystems are disposed between the wheel-hub assembly and the vehicle-connection interface.

In some embodiments, connection of the sub-frame to the reference-frame by engagement of the vehicle-connection interface with the VCM-connection interface is carried out when the vehicle-connection interface of the VCM is disposed at a height of the reference-frame.

In some embodiments, the VCM-connection interface includes a bar extending from the reference-frame in a direction parallel to a longitudinal axis of the reference-frame, and the vehicle-connection interface includes a clamp adapted to be clamped onto the bar, thereby to connect the VCM to the vehicle. In some such embodiments, clamping of the clamp about the bar is adapted to be reinforced by at least one fastener. In some embodiments, the clamp is slidable onto the bar.

In some embodiments, the bar extends between the reference frame and a bumper of the vehicle platform. In some such embodiments, the clamp is mounted onto the bar prior to installation of the bumper, such that installation of the bumper reinforces the connection of the VCM to the vehicle platform.

In some embodiments, the sub-frame is adapted for attachment to a flat reference-frame which is devoid of raised connection portions disposed above an upper surface of the reference-frame or below a lower surface of the reference-frame.

In some embodiments, the sub-frame includes a second connection interface, adapted for connection to a vehicle assembly coupled to the reference-frame. In some such embodiments, the vehicle assembly includes a top-hat frame of the vehicle, which is adapted to envelop the wheel.

In some embodiments, the vehicle-connection interface includes a plurality of fasteners adapted for fastening the VCM to corresponding bores forming part of the VCM-connection interface of the reference-frame.

In some embodiments, the vehicle-connection interface is adapted for snap-fit engagement with the VCM-connection interface of the reference-frame.

In some embodiments, the at least one subsystem includes a suspension subsystem, disposed between the wheel-hub assembly and the vehicle-connection interface.

In some embodiments, the VCM is devoid of a steering subsystem, and includes a drive subsystem. In other embodiments, the VCM is devoid of a drive subsystem, and includes a steering subsystem.

In some embodiments, at least one of camber, caster, and toe angle of the wheel is adjustable by making adjustments to the engagement between the vehicle-connection interface and the VCM-connection interface, when the VCM is connected to the vehicle platform.

In some embodiments, the VCM further includes a VCM-portion of a multi-interface connection-element, mounted onto the sub-frame and adapted for connection to a vehicle-platform-portion of the multi-interface connection-element, the vehicle-platform-portion being mounted onto the reference-frame of the vehicle platform and connected to multiple electronic or flow subsystems of the vehicle. The VCM-portion of the multi-interface connection-element may include multiple connection interfaces for connection of the VCM-portion to the vehicle-platform-portion, thereby to connect the VCM to each of the multiple electronic subsystems of the vehicle. Each of the multiple electronic or flow subsystems may be selected from the group consisting of a power supply of the vehicle, a control-circuit of the vehicle, a computerized controller of the vehicle, a network bus of the vehicle, a network interface of the vehicle, a coolant flow subsystem of the vehicle, an oil flow subsystem of the vehicle, and a brake-fluid flow subsystem of the vehicle.

There is additionally provided, in accordance with an embodiment of the teachings herein, a vehicle corner module (VCM) connectable to a VCM-connection interface of a reference-frame of a vehicle platform, for regulating motion of a vehicle, the VCM including:
- a sub-frame including a vehicle-connection interface for reversible mechanical connection of the VCM to the VCM-connection interface of the reference frame;
- a wheel-hub assembly including a wheel-hub adapted for mounting of a wheel thereon; and
- at least one subsystem of the vehicle, mounted onto the sub-frame, the at least one subsystem being selected from the group of subsystems consisting of a drive subsystem, a steering subsystem, a suspension subsystem, and a braking subsystem,
- wherein, when a wheel is mounted on the wheel-hub assembly, the vehicle-connection interface is disposed within a cylindrical footprint of the wheel, and
- wherein, when the sub-frame is connected to the reference-frame by engagement of the vehicle-connection interface with the VCM-connection interface, the vehicle-connection interface is disposed at a height between a height of an upper surface of the reference-frame and a height of a lower surface of the reference-frame.

In some embodiments, at least one of the at least one subsystem is accommodated between the wheel-hub assembly and the vehicle-connection interface.

In some embodiments, when the sub-frame is connected to the reference-frame by engagement of the vehicle-connection interface with the VCM-connection interface, the vehicle-connection interface is disposed between the wheel and the reference-frame.

In some embodiments, the vehicle further includes at least one power supply, and the VCM further includes at least one connector for connection to the at least one power supply, such that, when the VCM is connected to the vehicle, the at least one power supply powers the at least one subsystem.

In some embodiments, the at least one subsystem includes at least one of a subsystem disposed between the wheel-hub assembly and the vehicle-connection interface and a subsystem mounted onto a portion of the sub-frame adapted, when the sub-frame is connected to the reference-frame, to be disposed within the reference frame, between upper and lower surfaces of the reference frame.

In some embodiments, all of the subsystems in the plurality of subsystems are disposed between the wheel-hub assembly and the vehicle-connection interface.

In some embodiments, connection of the sub-frame to the reference-frame by engagement of the vehicle-connection interface with the VCM-connection interface is carried out when the vehicle-connection interface of the VCM is disposed at a height of the reference-frame.

In some embodiments, the VCM-connection interface includes a bar extending from the reference-frame in a direction parallel to a longitudinal axis of the reference-frame, and the vehicle-connection interface includes a clamp adapted to be clamped onto the bar, thereby to connect the VCM to the vehicle. In some embodiments, clamping of the clamp about the bar is adapted to be reinforced by at least one fastener. In some embodiments, the clamp is slidable onto the bar. In some embodiments, the bar extends between the reference frame and a bumper of the vehicle platform. In some embodiments, the clamp is slidable onto the bar prior to installation of the bumper, such that installation of the bumper reinforces the connection of the VCM to the vehicle platform.

In some embodiments, the sub-frame is adapted for attachment to a flat reference-frame which is devoid of raised connection portions disposed above an upper surface of the reference frame or below a lower surface of the reference frame.

In some embodiments, the sub-frame includes a second connection interface, adapted for connection to a vehicle assembly coupled to the reference frame. In some embodiments, the vehicle assembly includes a top-hat frame of the vehicle, which is adapted to envelop the wheel.

In some embodiments, the vehicle-connection interface includes a plurality of fasteners adapted for fastening the VCM to corresponding bores forming part of the VCM-connection interface of the reference-frame.

In some embodiments, the vehicle-connection interface is adapted for snap-fit engagement with the VCM-connection interface of the reference-frame.

In some embodiments, the at least one subsystem includes a suspension subsystem, disposed between the wheel-hub assembly and the vehicle-connection interface.

In some embodiments, the VCM is devoid of a steering subsystem, and includes a drive subsystem. In other embodiments, the VCM is devoid of a drive subsystem, and includes a steering subsystem.

In some embodiments, at least one of camber, caster, and toe angle of the wheel is adjustable by making adjustments to the engagement between the vehicle-connection interface and the VCM-connection interface, when the VCM is connected to the vehicle platform.

In some embodiments, the VCM further includes a VCM-portion of a multi-interface connection-element, mounted onto the sub-frame and adapted for connection to a vehicle-platform-portion of the multi-interface connection-element, the vehicle-platform-portion being mounted onto the reference-frame of the vehicle platform and connected to multiple electronic or flow subsystems of the vehicle. The VCM-portion of the multi-interface connection-element may include multiple connection interfaces for connection of the VCM-portion to the vehicle-platform-portion, thereby to connect the VCM to each of the multiple electronic subsystems of the vehicle. Each of the multiple electronic or flow subsystems may be selected from the group consisting of a power supply of the vehicle, a control-circuit of the vehicle, a computerized controller of the vehicle, a network bus of the vehicle, a network interface of the vehicle, a coolant flow subsystem of the vehicle, an oil flow subsystem of the vehicle, and a brake-fluid flow subsystem of the vehicle.

There is further provided, in accordance with an embodiment of the teachings herein, a vehicle platform of a vehicle, adapted for connection to at least one Vehicle Corner Module (VCM) adapted to regulate motion of the vehicle, the vehicle platform including a reference frame including:
  an upper surface and a lower surface; and
  at least one bar, forming a VCM-connection interface adapted to have a clamp of the VCM mounted thereon for reversible mechanical connection of the VCM to the reference frame.

In some embodiments, the bar is sized and configured for slidable mounting of the VCM thereonto.

In some embodiments, the vehicle platform further includes at least one bumper, mounted onto the reference frame, distal to the bar. In some embodiments, the bar engages both the reference frame and the bumper. In other embodiments, the bar engages the reference frame and extends from the reference frame towards the bumper, without engaging the bumper.

In some embodiments, the vehicle platform further includes a vehicle-platform-portion of a multi-interface connection-element, mounted onto the reference frame and connected to multiple electronic or flow subsystems of the vehicle, the vehicle-platform-portion being adapted for connection to a VCM-portion of the multi-interface connection-element, the VCM-portion being mounted onto a sub-frame of the VCM. The vehicle-platform-portion of the multi-interface connection-element may include multiple connection interfaces for connection of the vehicle-platform-portion to the VCM-portion, thereby to connect the VCM to each of the multiple electronic subsystems of the vehicle. Each of the multiple electronic or flow subsystems may be selected from the group consisting of a power supply of the vehicle, a control-circuit of the vehicle, a computerized controller of the vehicle, a network bus of the vehicle, a network interface of the vehicle, a coolant flow subsystem of the vehicle, an oil flow subsystem of the vehicle, and a brake-fluid flow subsystem of the vehicle.

There is also provided, in accordance with an embodiment of the teachings herein, a vehicle including:
  a vehicle platform including a reference frame having an upper surface and a lower surface, the reference frame including at least one VCM-connection interface;
  at least one vehicle corner module (VCM) connected to a VCM-connection interface of the reference-frame, the at least one VCM adapted for regulating motion of the vehicle, the VCM including:
    a sub-frame including a vehicle-connection interface reversibly and mechanically engaging the VCM-connection interface of the reference frame;
    a wheel-hub assembly including a wheel-hub adapted for mounting of a wheel thereon; and
    at least one subsystem of the vehicle, mounted onto the sub-frame, the at least one subsystem being selected from the group of subsystems consisting of a drive subsystem, a steering subsystem, a suspension subsystem, and a braking subsystem,
  wherein, when a wheel is mounted on the wheel-hub assembly, the vehicle-connection interface and the VCM-connection interface are accommodated within a cylindrical footprint of the wheel.

In some embodiments, the vehicle-connection interface of the sub-frame is reversibly and mechanically connected to the VCM-connection interface of the reference frame.

In some embodiments, the vehicle-connection interface and the VCM-connection interface are disposed at a height between a height of the upper surface of the reference-frame and a height of the lower surface of the reference-frame.

In some embodiments, at least one of the at least one subsystem is accommodated between the wheel-hub assembly and the vehicle-connection interface.

In some embodiments, the vehicle-connection interface is disposed between the wheel and the reference-frame.

In some embodiments, the vehicle further includes at least one power supply, the VCM being connected to the at least one power supply such that the at least one power supply powers the at least one subsystem.

In some embodiments, the at least one subsystem includes at least one of a subsystem disposed between the wheel-hub assembly and the vehicle-connection interface and a subsystem mounted onto a portion of the sub-frame disposed within the reference frame, between upper and lower surfaces of the reference frame.

In some embodiments, all of the subsystems in the plurality of subsystems are disposed between the wheel-hub assembly and the vehicle-connection interface.

In some embodiments, the sub-frame is connected to the reference-frame when the vehicle-connection interface of the VCM is disposed at a height of the reference-frame.

In some embodiments, the VCM-connection interface includes a bar extending from the reference-frame in a direction parallel to a longitudinal axis of the reference-frame, and the vehicle-connection interface includes a clamp clamped onto the bar, thereby connecting the VCM to the reference-frame. In some embodiments, clamping of the clamp about the bar is adapted to be reinforced by at least one fastener. In some embodiments, the clamp is slidable onto the bar.

In some embodiments, the vehicle platform further includes a bumper, and the bar extends between the reference frame and the bumper. In some embodiments, the clamp is slidable onto the bar prior to installation of the bumper, such that installation of the bumper reinforces the connection of the VCM to the vehicle platform.

In some embodiments, the reference-frame is flat and is devoid of raised connection portions disposed above an upper surface of the reference frame or below a lower surface of the reference frame.

In some embodiments, the vehicle platform includes a vehicle assembly coupled to the reference frame and the sub-frame includes a second connection interface, connected to the vehicle assembly. In some embodiments, the vehicle assembly includes a top-hat frame enveloping the wheel.

In some embodiments, the vehicle-connection interface includes a plurality of fasteners fastening the VCM to corresponding bores forming part of the VCM-connection interface of the reference-frame.

In some embodiments, the vehicle-connection interface engages the VCM-connection interface of the reference-frame by snap-fit engagement.

In some embodiments, the at least one subsystem includes a suspension subsystem, disposed between the wheel-hub assembly and the vehicle-connection interface.

In some embodiments, the VCM is devoid of a steering subsystem, and includes a drive subsystem. In other embodiments, the VCM is devoid of a drive subsystem, and includes a steering subsystem.

In some embodiments, at least one of camber, caster, and toe angle of the wheel is adjustable by adjusting the engagement between the vehicle-connection interface and the VCM-connection interface.

In some embodiments, the vehicle further includes multiple electronic or flow subsystems, each selected from the subsystem group consisting of a power supply, a control-circuit, a computerized controller, a network bus, a network interface, a coolant flow subsystem, an oil flow subsystem, and a brake fluid flow subsystem. The vehicle further includes a multi-interface connection-element including a VCM-portion mounted onto the sub-frame, reversibly connected to a corresponding vehicle-platform-portion mounted onto the reference-frame and connected to the multiple electronic or flow subsystems, each of the VCM-portion and the vehicle-platform-portion including multiple connection interfaces for connection to the other of the VCM-portion and the vehicle-platform-portion. Connection of the VCM-portion to the vehicle-platform-portion of the multi-interface connection-element results in connection of the VCM to the multiple electronic or flow subsystems.

In some embodiments, for each electronic or flow subsystem of the multiple electronic or flow subsystems, one of the VCM-portion and vehicle-platform-portion of the multi-interface connection-element includes a port, and the other of the VCM-portion and vehicle-platform-portion includes a corresponding plug, which, when the first and second portions are connected, is received in the port to connect the VCM to the electronic or flow subsystem.

There is additionally provided, in accordance with an embodiment of the teachings herein, a vehicle corner module (VCM) connectable to a VCM-connection interface of a reference-frame of a vehicle platform, the reference-frame having mounted thereon a vehicle-platform-portion of a multi-interface connection-element, the vehicle-platform-portion including multiple connection interfaces, each connected to one of multiple electronic or flow subsystems of the vehicle, the VCM including:

a sub-frame including a vehicle-connection interface for reversible mechanical connection of the VCM to the VCM-connection interface of the reference frame;

a wheel-hub assembly including a wheel-hub adapted for mounting of a wheel thereon;

at least one subsystem of the vehicle, mounted onto the sub-frame, the at least one subsystem being selected from the group of subsystems consisting of a drive subsystem, a steering subsystem, a suspension subsystem, and a braking subsystem; and a VCM-portion of the multi-interface connection-element mounted onto the sub-frame, the VCM-portion being connectable to the vehicle-platform-portion of the multi-interface connection-element and including multiple corresponding connection interfaces for connection to connection interfaces of the vehicle-platform-portion, wherein, connection of the VCM-portion to the vehicle-platform-portion of the multi-interface connection-element results in connection of the VCM to the multiple electronic or flow subsystems.

In some embodiments, each of the multiple corresponding connection interfaces is adapted for connection of the VCM to one of the multiple electronic or flow subsystems, each of which is selected from the subsystem group consisting of power supply of the vehicle, a control-circuit of the vehicle, a computerized controller of the vehicle, a network bus of the vehicle, a network interface of the vehicle, a coolant flow subsystem of the vehicle, an oil flow subsystem of the vehicle, and a brake-fluid flow subsystem of the vehicle. In some embodiments, each of the multiple corresponding connector interfaces of the VCM-portion includes a plug adapted to be inserted into a port in the vehicle-platform-portion or a port adapted to receive a plug of the vehicle-platform-portion.

In some embodiments, when a wheel is mounted on the wheel-hub assembly, the vehicle-connection interface is disposed within a cylindrical footprint of the wheel. In some embodiments, at least one of the at least one subsystem is accommodated between the wheel-hub assembly and the vehicle-connection interface.

In some embodiments, when the sub-frame is connected to the reference-frame by engagement of the vehicle-connection interface with the VCM-connection interface, the vehicle-connection interface is disposed between the wheel and the reference-frame.

In some embodiments, when the sub-frame is connected to the reference-frame by engagement of the vehicle-connection interface with the VCM-connection interface, the vehicle-connection interface is disposed at a height between a height of an upper surface of the reference-frame and a height of a lower surface of the reference-frame.

In some embodiments, the vehicle further includes at least one power supply, and the VCM further includes at least one connector for connection to the at least one power supply, such that, when the VCM is connected to the vehicle, the at least one power supply powers the at least one subsystem.

In some embodiments, the at least one subsystem includes at least one of a subsystem disposed between the wheel-hub assembly and the vehicle-connection interface and a subsystem mounted onto a portion of the sub-frame adapted, when the sub-frame is connected to the reference-frame, to be disposed within the reference frame, between upper and lower surfaces of the reference frame.

In some embodiments, all of the subsystems in the plurality of subsystems are disposed between the wheel-hub assembly and the vehicle-connection interface.

In some embodiments, connection of the sub-frame to the reference-frame by engagement of the vehicle-connection interface with the VCM-connection interface is carried out when the vehicle-connection interface of the VCM is disposed at a height of the reference-frame.

In some embodiments, the VCM-connection interface includes a bar extending from the reference-frame in a direction parallel to a longitudinal axis of the reference-frame, and the vehicle-connection interface includes a clamp adapted to be clamped onto the bar, thereby to connect the VCM to the vehicle. In some embodiments, clamping of the clamp about the bar is adapted to be reinforced by at least one fastener. In some embodiments, the clamp is slidable onto the bar. In some embodiments, the bar extends between the reference frame and a bumper of the vehicle platform.

In some embodiments, the sub-frame is adapted for attachment to a flat reference-frame which is devoid of raised connection portions disposed above an upper surface of the reference-frame or below a lower surface of the reference-frame.

In some embodiments, the sub-frame includes a second connection interface, adapted for connection to a vehicle assembly coupled to the reference frame. In some embodiments, the vehicle assembly includes a top-hat frame of the vehicle, which is adapted to envelop the wheel.

In some embodiments, the vehicle-connection interface includes a plurality of fasteners adapted for fastening the VCM to corresponding bores forming part of the VCM-connection interface of the reference-frame.

In some embodiments, the vehicle-connection interface is adapted for snap-fit engagement with the VCM-connection interface of the reference-frame.

In some embodiments, the at least one subsystem includes a suspension subsystem, disposed between the wheel-hub assembly and the vehicle-connection interface.

In some embodiments, the VCM is devoid of a steering subsystem, and includes a drive subsystem. In other embodiments, the VCM is devoid of a drive subsystem, and includes a steering subsystem.

In some embodiments, at least one of camber, caster, and toe angle of the wheel is adjustable by making adjustments to the engagement between the vehicle-connection interface and the VCM-connection interface, when the VCM is connected to the vehicle platform.

There is further provided, in accordance with an embodiment of the teachings herein, a method for installing a Vehicle Corner Module (VCM) on a vehicle platform of a vehicle, the method including:

aligning a vehicle-connection interface of a sub-frame of the VCM with a reference-frame of the vehicle-platform, such that the vehicle-connection interface is disposed between upper and lower surfaces of the reference frame; and without changing the height alignment between the vehicle-connection interface of the VCM and the reference-frame, mechanically connect the at least one VCM to the reference-frame by engagement of the vehicle-connection interface with a VCM-connection interface of the reference frame.

In some embodiments, the method further includes connecting the VCM to multiple electronic or flow subsystems of the vehicle by connecting a VCM-portion of a multi-interface connection-element, mounted on the sub-frame, to a vehicle-platform portion of the multi-interface connection-element, forming part of the vehicle platform. In some embodiments, each of the multiple electronic and/or flow subsystems is selected from the subsystem group consisting of a power supply, a control-circuit, a computerized controller, a network bus, a network interface, a coolant flow subsystem, an oil flow subsystem, and a brake-fluid flow subsystem.

In some embodiments, the mechanically connecting includes pushing the VCM laterally, in a direction perpendicular to a longitudinal axis of the reference-frame, for the vehicle-connection interface to engage the VCM-connection interface. In some embodiments, the mechanically connecting includes pushing the VCM longitudinally, in a direction parallel to a longitudinal axis of the reference-frame, for the vehicle-connection interface to engage the VCM-connection interface.

In some embodiments, the mechanically connecting includes placing fasteners which engage the vehicle-connection interface and the VCM-connection interface.

In some embodiments, the VCM-connection interface includes a bar extending from the reference frame in a direction parallel to a longitudinal axis of the reference frame, the vehicle-connection interface includes a clamp including an opening, the clamp adapted to be clamped onto the bar, and the mechanically connecting includes mounting the clamp onto the bar. In some embodiments, the mounting of the clamp onto the bar includes sliding of the clamp onto the bar.

In some embodiments, the method further includes connecting at least one bumper to the reference frame. In some embodiments, the connecting of the bumper occurs after the sliding of the clamp. In other embodiments, the connecting of the bumper occurs prior to the sliding of the clamp.

There is also provided, in accordance with an embodiment of the teachings herein, a multi-interface connection-element for connection of multiple electronic or flow vehicle subsystems of a vehicle to a Vehicle Corner Module (VCM) mounted onto a reference-frame of a vehicle platform of the vehicle, the VCM being adapted to regulate motion of the vehicle, the multi-interface connection-element including:

a vehicle-platform-portion mountable onto the reference frame of the vehicle, the vehicle-platform-portion including multiple connection interfaces, each adapted to be associated with one of the multiple electronic or flow vehicle subsystems;

a VCM-portion, mountable onto a sub-frame of the VCM, the VCM-portion including multiple corresponding connection interfaces adapted for connection to the multiple connection interfaces of the vehicle-platform-portion, wherein connection of the connection interfaces of the vehicle-platform-portion to the multiple corresponding connection interfaces of the VCM-portion results in connection of the VCM to the multiple electronic or flow subsystems.

In some embodiments, each of the multiple electronic or flow subsystems is selected from the subsystem group consisting of: a power supply of the vehicle, a control-circuit of the vehicle, a computerized controller of the vehicle, a network bus of the vehicle, a network interface of the vehicle, a coolant flow subsystem of the vehicle, an oil flow subsystem of the vehicle, and a brake-fluid flow subsystem of the vehicle.

In some embodiments, connection of the connection interfaces of the vehicle-platform-portion to the multiple corresponding connection interfaces of the VCM-portion results in connection of at least one VCM-subsystem to at least one of the multiple electronic or flow subsystems. In some embodiments, the at least one VCM-subsystem includes at least one of a drive subsystem, a steering subsystem, a braking subsystem, a suspension subsystem, a VCM controller, and a cooling subsystem.

In some embodiments, the multi-interface connection-element further includes a motion actuator extending between a back portion of the VCM and a front portion of the VCM, and adapted to actuate motion of the VCM-portion relative to the vehicle-platform-portion for connection thereof. In some embodiments, the motion actuator is disposed at a different portion of the VCM than the VCM-portion, such that motion of the VCM-portion can be actuated even when the VCM-portion is inaccessible.

In some embodiments, the motion actuator includes a fastener connected to the VCM-portion by a connector cable, and wherein motion of the VCM-portion is actuated by operating the fastener to transfer movement actuation forces from the fastener to the VCM-portion.

In some embodiments, the motion actuator includes a fastener connected to the VCM-portion by a fluid-flow conduit, and wherein motion of the VCM-portion is actuated by transmitting a fluid through the fluid-flow conduit from the fastener to the VCM-portion.

In some embodiments, the motion actuator includes an electrical motor, adapted to be remotely operated by a remote controller.

In some embodiments, a connection-assembly connecting the VCM-portion to a sub-frame of the VCM includes at least one spring, adapted to apply force on VCM-portion toward the vehicle-platform-portion.

There is additionally provided, in accordance with an embodiment of the teachings herein, a method of connecting at least one VCM-subsystem mounted onto a Vehicle Corner Module (VCM) to at least one electronic or flow subsystem mounted onto a vehicle platform of a vehicle, the method including connecting a VCM-portion of a multi-interface connection-element, mounted on a sub-frame of the VCM and connected to the at least one VCM-subsystem, to a vehicle-platform-portion of the multi-interface connection-element forming part of the vehicle platform and connected to the at least one vehicle-subsystem, thereby to form a connection between the at least one VCM-subsystem and the at least one electronic or flow subsystem. Each of the VCM-portion and the vehicle-platform-portion of the multi-interface connection-element includes a plurality of connection interfaces, each associated with one of a plurality of electronic or flow subsystems.

In some embodiments, each of the multiple electronic and/or flow subsystems is selected from the subsystem group consisting of a power supply, a control-circuit, a computerized controller, a network bus, a network interface, a coolant flow subsystem, an oil flow subsystem, and a brake-fluid flow subsystem.

In some embodiments, the connecting of the VCM-portion and the vehicle-platform-portion includes moving the VCM-portion relative to the vehicle-platform-portion until they are connected. In some embodiments, only one of the VCM-portion and the vehicle-platform-portion is movable, and the other is stationary.

In some embodiments, moving the VCM-portion relative to the vehicle-platform-portion includes actuating motion of the VCM-portion by a mechanical mechanism that extends between a back portion of the VCM and a front portion of the VCM. In some embodiments, the mechanical mechanism actuating motion of the VCM-portion is remote to the location of the VCM-portion.

In some embodiments, the mechanical mechanism includes a fastener connected to the VCM-portion by a connector cable, and wherein the actuating motion includes operating the connector fastener to transfer movement actuation forces from the fastener to the VCM-portion.

In some embodiments, the mechanical mechanism includes a fastener connected to the VCM-portion, and wherein actuating motion includes operating the fastener to transmit movement actuation forces to the VCM portion by fluid communication via the conduit.

In some embodiments, actuation of motion of at least one of the VCM-portion and the vehicle-platform portion is by an electrical motor. In some embodiments, the electrical motor is adapted to be remotely operated by a remote controller.

In some embodiments, the connecting is carried out from a front side of the VCM, regardless of the positioning of the VCM-connector within the VCM.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

DETAILED DESCRIPTION OF SOME EMBODIMENTS OF THE INVENTION

Figure 1:
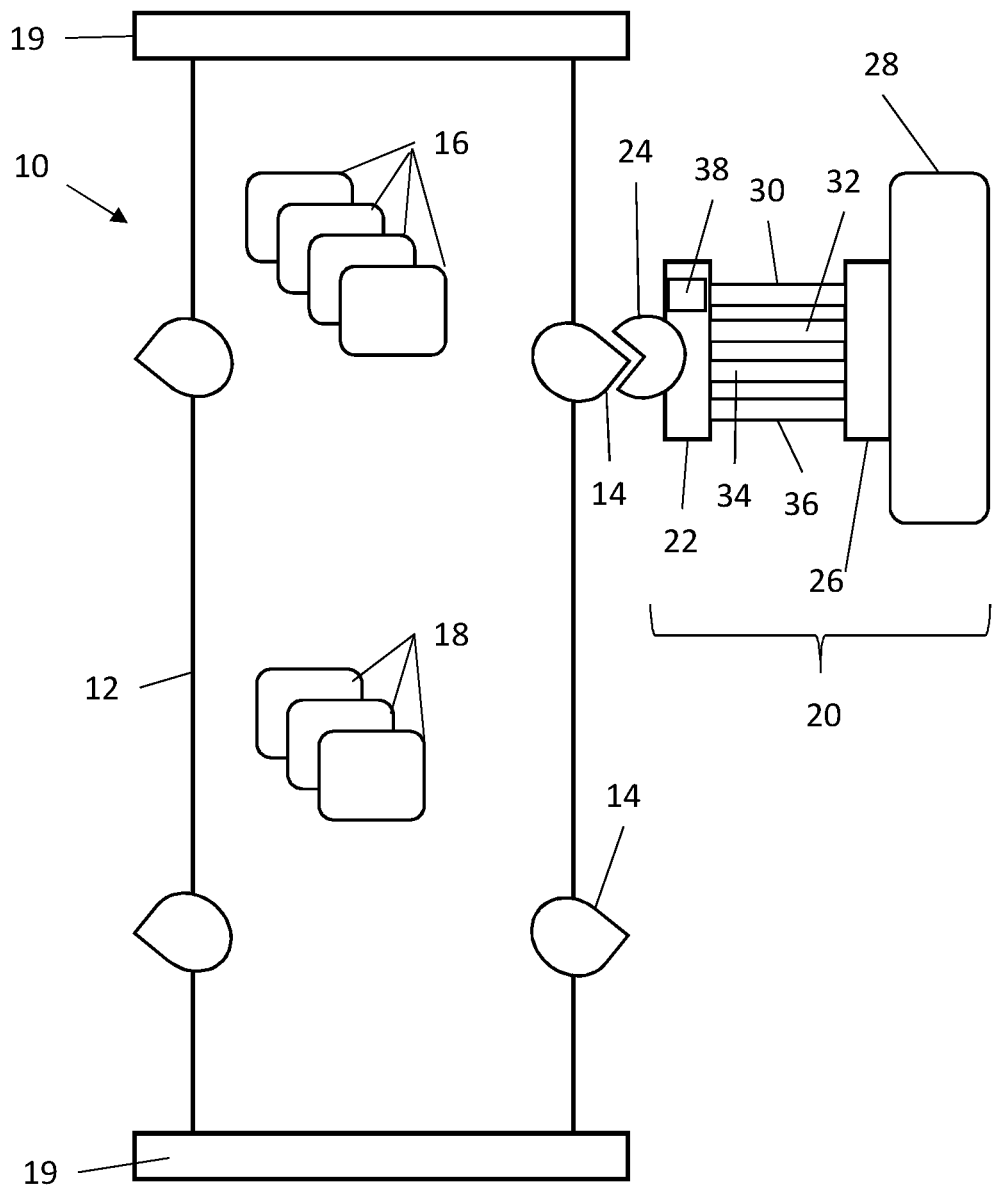
FIG. 1 is a schematic block diagram of a VCM and a vehicle platform adapted to have the VCM mounted thereon, according to an embodiment of the disclosed technology.

The invention, in some embodiments, relates to methods and systems for installing Vehicle Corner Modules (VCMs) on a reference frame, or platform, of the vehicle. These include various interfaces for installing the VCMs on the reference frames, as well as specialized connectors simplifying the installation of the VCMs.

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

Unless otherwise indicated, a "vehicle corner module" or "VCM" as used herein means an assembly for supporting a wheel of a vehicle and regulating the motion of a vehicle according to any of the embodiments disclosed herein. The VCM assembly includes components such as (and not exhaustively): steering systems, suspension systems, braking systems including hydraulic subsystems, gearing assemblies, drive motors, drive shafts, wheel hub assemblies, controllers, communications arrangements, and electrical wiring. In some embodiments, a VCM can include a wheel and tire. A VCM can be mounted to a 'reference frame' of a vehicle, e.g., a chassis or similar vehicle frame or a platform. When a VCM is described as being installed in/on a vehicle, then the VCM is mounted to the reference frame. A VCM may include a 'sub-frame' to which some or all of the VCM components are mounted or otherwise attached. In some cases, the sub-frame mediates between the reference frame and the various VCM components.

The term 'sub-frame' should be understood to mean any rigid frame or one or more structural elements in fixed combination. The 'sub' prefix is intended to distinguish the sub-frame from a main frame or reference frame of the vehicle. A VCM may or may not include one or more electric motors and/or the wheel itself (and tire).

When used in this specification and in the claims appended hereto, the word "vehicle" is to be understood as referring to a vehicle having one or more wheels. Non-limiting examples of a vehicle, according to this definition, are a vehicle with motive power provided by an onboard engine, and an 'electric vehicle' powered, when in motion, by one or more electric motors and a battery or other energy storage device onboard. The battery need not be provided with the vehicle, or installed in the vehicle, unless and until the vehicle is in motion. The word 'vehicle' should also be understood as encompassing a "vehicle platform" comprising at least a chassis (or other 'reference frame' to which VCMs can be mounted) and one or more wheels. A 'vehicle platform' need not necessarily comprise, at the time of providing the vehicle platform, all of the accoutrements required for transport of passengers and/or cargo such as vehicle-body components or interior furnishings.

The term "controller" as used herein means a computing device configured for monitoring, controlling, regulating and/or actuating one or more components, systems or subsystems. A controller should be understood to include any or all of (and not exhaustively): one or more processors, one or more computer-readable media, e.g., transient and/or non-transient storage media, communications arrangements, a power source and/or a connection to a power source, and firmware and/or software. When used herein in a hyphenated expression such as vehicle-controller or VCM-controller, the term means a controller for controlling the vehicle and/or components and/or subsystems of the vehicle, or a controller for controlling the VCM and/or components and/or subsystems of the VCM, respectively. Unless specifically noted otherwise, a controller is installed in or on the controlled element (vehicle, VCM, etc.) while a "control unit" is like a controller but is not installed in or on the controlled element. For example, a VCM-controller is located in or on the VCM, while a VCM control unit is not, and may be located elsewhere on the vehicle, e.g., on the chassis unit. Controllers (and control units) can be programmed in advance, e.g., by having program instructions stored in the computer-readable media for execution by one of more processors of the controller. Thus, a controller 'configured' to perform a function is equivalent herein to the controller being programmed, i.e., having access to stored program instructions for execution, to perform the function.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is now made to FIG. 1, which is a schematic block diagram of a VCM and a vehicle platform adapted to have the VCM mounted thereon, according to an embodiment of the disclosed technology.

As seen in FIG. 1, a vehicle platform 10, which is adapted to have a vehicle capsule mounted thereon, includes a vehicle reference-frame 12, having four VCM-connection interfaces 14 adapted for connection to VCMs. In the illustrated embodiment, all four VCM-connection interfaces 14 are identical to one another. However, in some embodiments, a single reference-frame may include multiple different types of VCM-connection interfaces, for example for connection to different types of VCMs.

Vehicle platform 10 may include one or more electronic subsystems 16 mounted onto reference frame 12, which may include a power supply of the vehicle, a control circuit of the vehicle, a computerized controller of the vehicle, a network bus of the vehicle, and a network interface of the vehicle. Vehicle platform 10 may further include one or more fluid flow subsystems 18 mounted onto reference frame 12, which may include a coolant flow subsystem, an oil flow subsystem, and a brake-fluid flow subsystem. In some embodiments, reference-frame 12 may also have attached thereto front and/or rear bumpers 19. Examples of subsystems 16 and 18 are described in PCT Patent Application No. PCT/IB2020/062598 and in U.S. Pat. No. 10,919,575, both of which are incorporated by reference as if fully set forth herein.

A VCM 20, for regulating motion of the vehicle, is connectable to reference frame 12, as explained herein. According to some embodiments, VCM 20 includes a sub-frame 22, including a vehicle-connection interface 24 adapted for reversible mechanical connection to VCM-connection interface 14 of reference frame 12. VCM 20 further includes a wheel-hub assembly 26, adapted to have a wheel 28 mounted thereon. Sub-frame 22 has mounted thereon one or more subsystems of the vehicle, each comprising mechanical and/or electrical components. The subsystems may also be attached to wheel-hub assembly 26.

As explained in further detail hereinbelow, in some embodiments, when wheel 28 is mounted on wheel-hub assembly 26, at least a portion of vehicle-connection interface 24 of VCM 20, and in some embodiments the entirety thereof, is disposed within a cylindrical footprint of the wheel. In the context of the present application, the "cylindrical footprint of the wheel" is the area resulting from projection of the wheel into another plane, parallel to a rotational plane of the wheel.

As shown in further detail hereinbelow, at least one subsystem mounted on sub-frame 22 is accommodated between wheel-hub assembly 26 and vehicle-connection interface 24. In some embodiments, all the subsystems mounted on sub-frame 22 are accommodated between wheel-hub assembly 26 and vehicle-connection interface 24. In other embodiments, in addition to the subsystem accommodated between the wheel-hub assembly and the vehicle-connection interface, at least one subsystem mounted onto sub-frame 22 is mounted onto a portion of the sub-frame, which, when the sub-frame is connected to reference frame 12, is disposed within the reference frame. In some embodiments, at least one subsystem mounted on sub-frame 22 is accommodated between wheel-hub assembly 26 and sub-frame 22.

As explained in further detail hereinbelow, when sub-frame 22 is connected to reference-frame 12 by engagement of the vehicle-connection interface 24 with the VCM-connection interface 14, the vehicle-connection interface may be disposed at a height between a height of an upper surface of the reference-frame and a height of a lower surface of the reference-frame. Even though the vehicle-connection interface is between the upper and lower surfaces of the reference-frame, there may be portions of the sub-frame which are outside of this range. In some embodiments, the height of vehicle-connection interface is between the heights of the upper and lower surfaces in a localized manner. In such embodiments, the vehicle-connection interface is between the height of the upper and lower surfaces, within a distance of 20-50 cm from the vehicle-connection interface. However, in other, more distant portions of the reference frame, the upper and lower surfaces may be at different heights, such that the vehicle-connection interface is not between the upper and lower surfaces in those more distant portions.

The subsystems included in the VCM may include a drive subsystem 30, a steering subsystem 32, a suspension subsystem 34, and/or a braking subsystem 36. Sub-frame 22 may also include a VCM-controller 38, adapted to control operation of one or more of subsystems 30, 32, 34, and 36, and/or to communicate with one or more electronic subsystems 16 of the vehicle, such as with a computerized controller or a network interface of the vehicle.

Drive subsystem 30 may include any or all of the mechanical and/or electrical components required for actuating a drive shaft to rotate wheel 28, or other wheels of the vehicle, to drive the vehicle, including, and not exhaustively: an electric drive motor, a driveshaft turned by the motor, and gearing assemblies to transmit the rotation to the wheel including, optionally, a single-hear or multi-gear transmission, as well as sensors such as a wheel speed sensor (in a non-limiting example, a rotary encoder). In some embodiments, the drive motor is included in the VCM, and in some embodiments, the drive motor is on the vehicle, e.g., installed on reference frame 12. In some embodiments, the drive motor is mounted on sub-frame 22 and thereby is a sprung mass.

In embodiments, VCM-controller 38 is adapted to regulate an output of the motor and/or a rotational velocity of wheel 28 and/or a selection of a transmission gear, in response to instructions received via electrical inputs from the vehicle, e.g., from a driver-operated drive mechanism (e.g. an accelerator pedal) or an autonomous driving unit. In embodiments, the instructions include, for example, a current and a voltage for actuating the electric drive motor.

In embodiments, drive subsystem 30 can be used in a regenerative braking scheme. In another example, the regenerative braking is boosted by friction braking, i.e., regular operation of braking subsystem 36.

In some embodiments, 'cooperation' of drive subsystem 30 and braking subsystem 36 in combining regenerative braking with friction braking can be controlled by VCM-controller 38. In yet another example, in which the VCM-controller is configured (e.g., programmed) to control multiple subsystems in cooperation with each other, steering subsystem 32 can be used to assist in braking, i.e., in cooperation with the braking system, for example by turning the wheels so as to increase friction with a roadway, whether by steering symmetrically by having the opposing wheels turn in the same direction in tandem, or asymmetrically where the opposing wheels do not turn in tandem. In a similar example, the VCM-controller controls steering subsystem 32 in concert with the braking system to mitigate the effect of brake pull caused by steering, a phenomenon also known as 'brake steer' or 'steering drift'. In yet another example, the VCM-controller controls, in concert, the drive system (with respect to regenerative braking), the braking system (with respect to friction braking) and the steering system (with respect to 'braking-by-steering') to achieve a desired braking effect.

Steering subsystem 32 may include any or all of the mechanical and/or electrical components required for steering, i.e., pivoting the wheel of the vehicle around a steering axis, including, and not exhaustively: a steering motor, a steering actuator, steering rods, steering system controller or control unit, steering inverter and wheel-angle sensor.

In some embodiments, VCM-controller 38 receives steering instructions as electrical (including electronic) inputs from the vehicle, e.g., from a driver-operated steering mechanism or an autonomous steering unit, and carries out the instructions by causing, responsively to the received instructions, the motion of a steering rod, e.g., via a steering actuator, to effect the turning of the wheel, for example, by regulating a current and voltage transmitted to the steering actuator and/or transmitting high-level instructions to a steering-system controller. The steering motor, actuator and/or inverter can receive electrical power from an external power source ('external' meaning external to the VCM), such as a power supply installed in or on the reference frame.

Suspension subsystem 34 may optionally include an active suspension system controllable by the VCM-controller 38 (e.g., via a suspension-system control unit).

Braking subsystem 36 may include any or all of the mechanical and electrical components for actuating a brake assembly (e.g., brake disk, brake caliper, etc.) including, optionally, one or more of a VCM-onboard hydraulic system, a VCM onboard vacuum-boost system, or a hybrid brake-assist system incorporating a pressurized-gas accumulator and brake actuator.

In some embodiments, VCM controller 38 is configured to regulate an output of the braking system, e.g., cause a braking action, in response to instructions received via electrical inputs from the vehicle, e.g., from a driver-operated braking mechanism (e.g. a brake pedal) or an autonomous braking unit.

In some embodiments, the plurality of VCM subsystems in VCM 20 includes all of subsystems 30, 32, 34, and 36. In other embodiments, the plurality of VCM subsystems in a given VCM 20 may include two or three of the subsystems.

In some embodiments, the connection interface between VCM 20 and reference frame 12 has one or more degrees of freedom. In such embodiments, the connection of the VCM to the reference frame is configurable, for example to control or configure any one of the caster angle of the wheel, the camber angle of the wheel, and the toe angle of the wheel.

Figure 2:
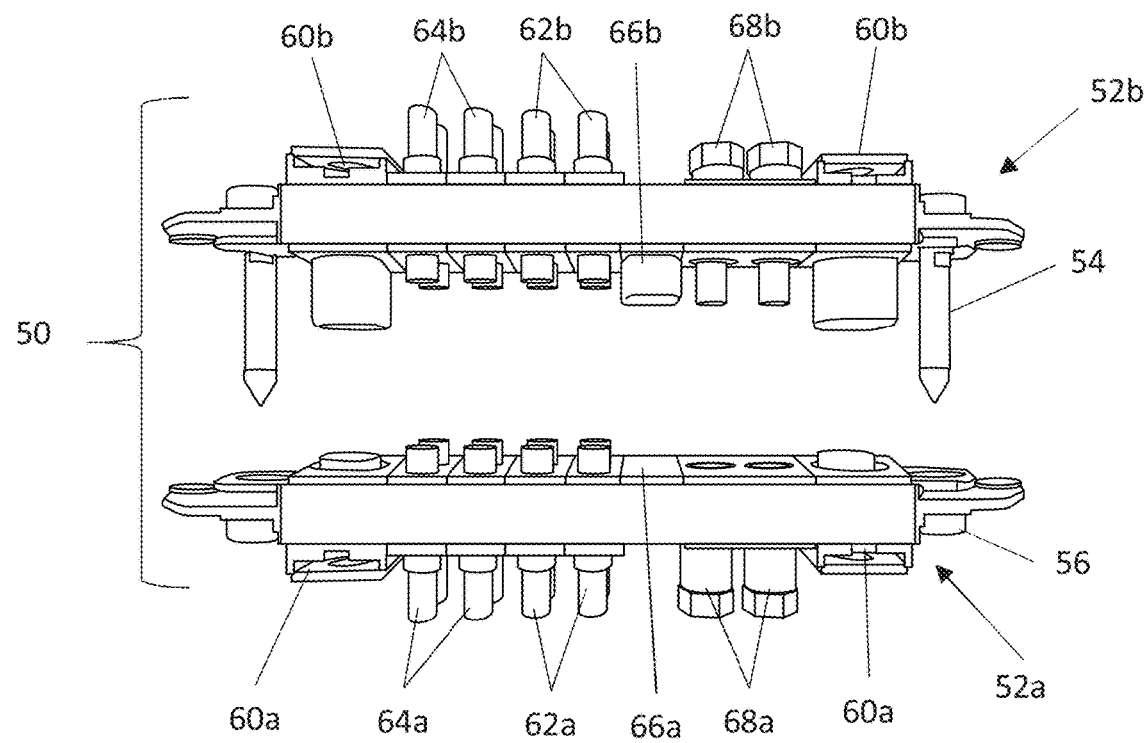
FIG. 2 is a photograph of a multi-interface connection-element for connection of a VCM to vehicle subsystems installed on a reference frame of the vehicle platform, according to an embodiment of the disclosed technology.
Figure 3A:
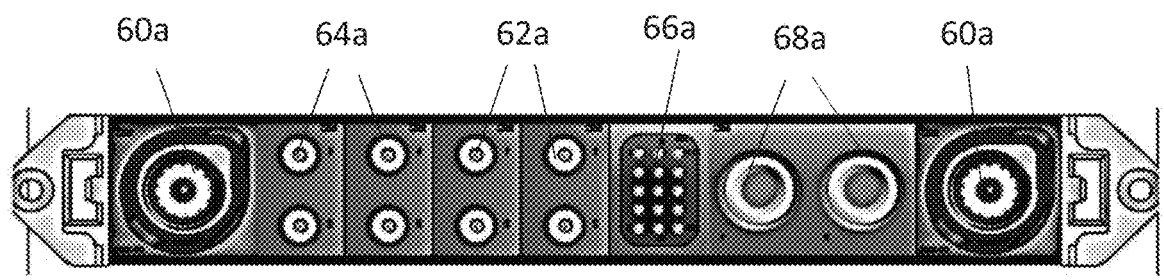
FIGS. 3A and 3B are schematic images of connection interfaces of respective vehicle-platform- and VCM-portions of the multi-interface connection-element of FIG. 2.
Figure 3B:
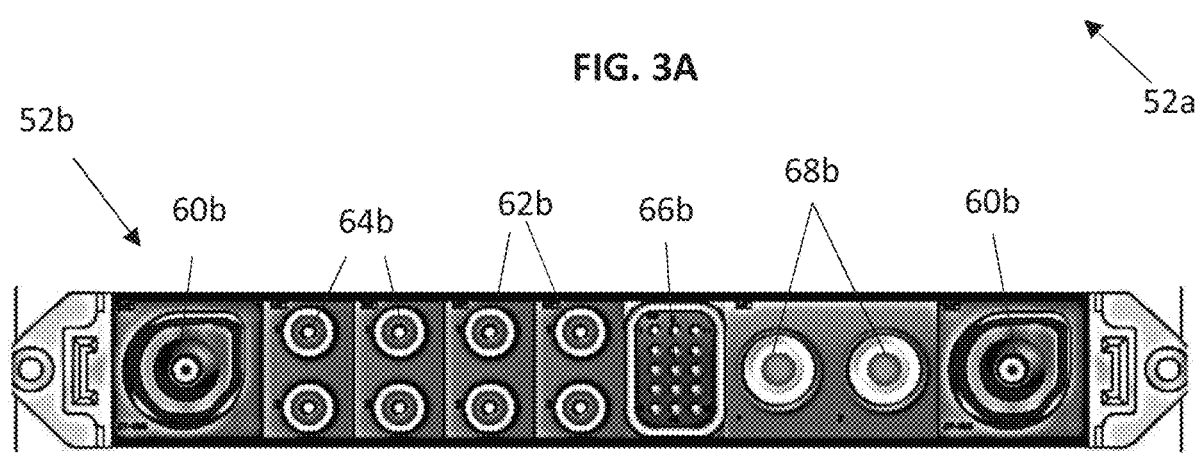

Reference is now made to FIG. 2, which is a photograph of a multi-interface connection-element 50 for connection of VCM subsystems, such as subsystems of VCM 20 of FIG. 1, to vehicle subsystems installed on a reference frame of the vehicle platform, such as subsystems 16 and 18 of FIG. 1, according to an embodiment of the disclosed technology. Reference is additionally made to FIGS. 3A and 3B, which are schematic images of connection interfaces of respective vehicle-platform- and VCM-portions of the multi-interface connection-element 50 of FIG. 2.

As seen, multi-interface connection-element 50 includes a vehicle-platform-portion 52a connectable to a reference frame of a vehicle platform, such as reference frame 12 of FIG. 1, and a VCM portion 52b connectable to a sub-frame of a VCM, such as sub-frame 22 of FIG. 1. Vehicle-platform-portion 52a and VCM-portion 52b are reversibly connectable to each other, for example by insertion of alignment pins 54 extending from one of the portions into corresponding bores 56 in the other portion. Each of portions 52a and 52b includes a plurality of connection interfaces, such that the two pluralities of connection interfaces correspond to one another.

For example, in the illustrated embodiment, vehicle-platform-portion 52a includes a pair of high voltage connectors 60a, two pairs of 12V battery connectors 62a, two pairs of 48V battery connectors 64a, a vehicle Controller Area Network (CAN) bus connector 66a, and a pair of coolant flow connectors 68a. VCM-portion 52b includes corresponding high voltage connectors 60b, 12V battery connectors 62b, 48V battery connectors 64b, vehicle CAN bus connector 66b, and coolant flow connectors 68b. In some embodiments, the connection interfaces of the portions of multi-interface connection-element 50 may include connection interfaces connected to any one or more of:

a power supply mounted on the vehicle platform;
a control-circuit mounted on the vehicle platform;
a computerized controller mounted on the vehicle platform;
a network bus mounted on the vehicle platform;
a network interface mounted on the vehicle platform;
a coolant flow subsystem mounted on the vehicle platform;
an oil flow subsystem mounted on the vehicle platform; and
a brake-fluid flow subsystem mounted on the vehicle platform.

Mechanical connection of vehicle-platform-portion 52a and VCM-portion 52b of multi-interface connection-element 50 results in connection of corresponding connection interfaces within the two portions. The connection interfaces of vehicle-platform-portion 52a are connected to various vehicle platform subsystems mounted onto the reference frame, such as subsystems 16 and 18 of FIG. 1. The connection interfaces of VCM-portion 52b are connected to various subsystems mounted onto the sub-frame of the VCM, such as subsystems 30, 32, 34, 36, and 38 of FIG. 1. As such, connection of the two portions of multi-interface connection-element 50 result in functional connection between the VCM subsystems and the vehicle subsystems. For example, connection to a vehicle power subsystem can be used to provide power to one or more of the VCM subsystems. As another example, connection to a coolant flow subsystem can be used to cool a motor mounted onto the VCM as part of drive subsystem 30 of FIG. 1, and connection to a brake-fluid flow subsystem can be used by braking subsystem 36 of FIG. 1.

Figure 4:
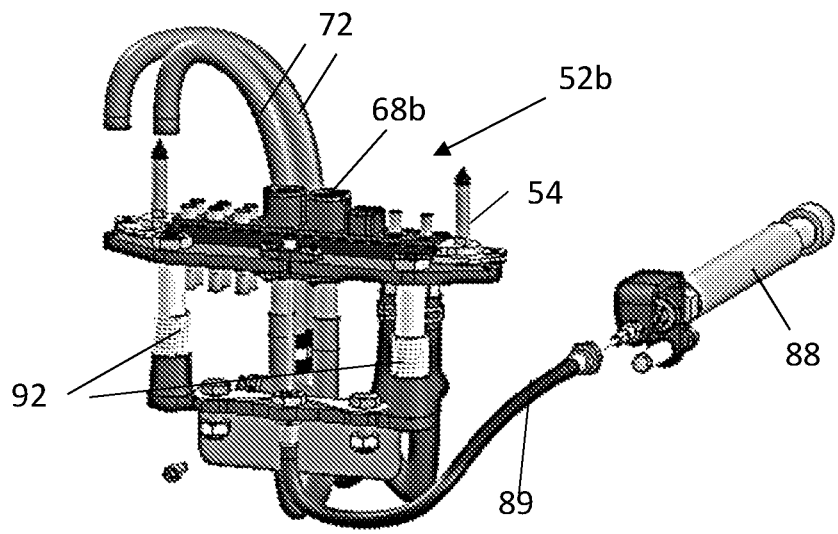
FIG. 4 is a perspective view illustration of a VCM-portion of the multi-interface connection-element of FIG. 2.
Figure 5:
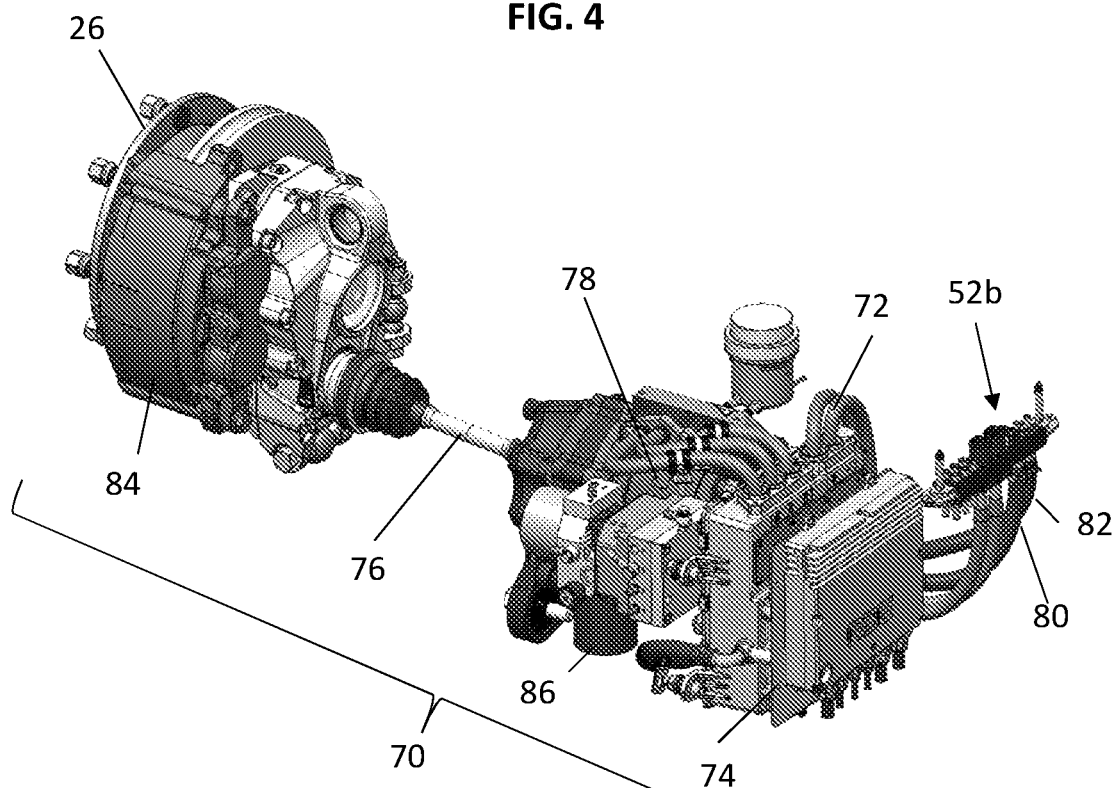
FIG. 5 is a perspective view illustration of a VCM-portion of the multi-interface connection-element of FIG. 2, including connection to various subsystems of a VCM, according to some embodiments of the disclosed technology.

Reference is now made to FIGS. 4 and 5, which are, respectively, a perspective view illustration of VCM-portion 52b of multi-interface connection-element 50 similar to that shown in FIG. 2, including connection to various subsystems mounted onto the reference frame of the vehicle platform, and of VCM-portion 52b mounted onto a VCM 70, similar to VCM 20 of FIG. 1. It will be appreciated that the specific connections included in the connection interfaces of the two portions of a multi-interface connection-element, and the arrangement of those connection interfaces within each portion, may differ in different implementations of the multi-interface connection-element, in accordance with the requirements of a specific vehicle, vehicle platform, VCM, or implementation.

As seen, coolant flow connectors 68b are connected to pipes 72, which are connected to a cooling subsystem 74 of VCM 70, shown clearly in FIG. 5. The cooling subsystem 74 may form part of, or be functionally associated with, the drive subsystem of VCM 70, which also includes a drive shaft 76, a motor 78, and a motor inverter. VCM 70 further includes a braking subsystem including a brake caliper 84 connected to wheel-hub assembly 26, and a brake pressure system 86 between VCM-portion 52b and brake caliper 84.

According to some embodiment, engaging VCM-portion 52b with vehicle-platform-portion 52a is by moving one or more of portions 52a/52b toward each other until being in a connection state. In some embodiments, one of portions 52a/52b is movable and the other is stationary. As shown in the example embodiment of FIGS. 4-5, VCM-portion 52b is movable and is actuated to connect with vehicle-platform-portion 52a by a mechanical mechanism that extends between a back portion of VCM and a front portion of VCM 70. The mechanical mechanism allows the movement of VCM-portion 52*b* between a connected state and a disengaged state with vehicle-platform-portion 52*a* while the actuation of this movement is remote from the location of VCM-portion 52*b* (e.g. from the front side of VCM 70, while VCM-portion 52*b* is on the back side). This allows the installation and connection of all VCM 70 subsystems and sub-frame with the vehicle platform, all from the front side of VCM 70.

According to some embodiments, the mechanical mechanism includes a connector fastener 88 connected to VCM-portion 52*b* by connector cable 89 adapter to transfer movement actuation forces from fastener 88 to VCM-portion 52*b*. In some embodiments actuation forces are transmitted between fastener 88 and VCM-portion 52*b* using fluid (e.g. pneumatic, hydraulic) and connector cable 89 is substituted by a tube filled with such fluid. In some embodiments fastener 88 is based on bolt screwed into a bore in sub-frame 22. In some embodiments, fastener 88 is a lever applying forces on cable 89.

In some embodiments, VCM-portion 52*b*, or a connection thereof to sub-frame 22, may include one or more springs 92, shown clearly in FIG. 4. Springs 92 are adapted to force VCM-portion 52*b* toward vehicle-platform-portion 52*a*, or vice versa, to assist in forming and/or maintaining an operational connection therebetween, and particularly between connection interfaces thereof.

In some embodiments, actuation of VCM-portion 52*b* is by an electrical motor. In some embodiments, the control of the mechanical or electrical actuation of VCM-portion 52*b* is by a remove controller and not by a mechanical fastening.

Figure 6:
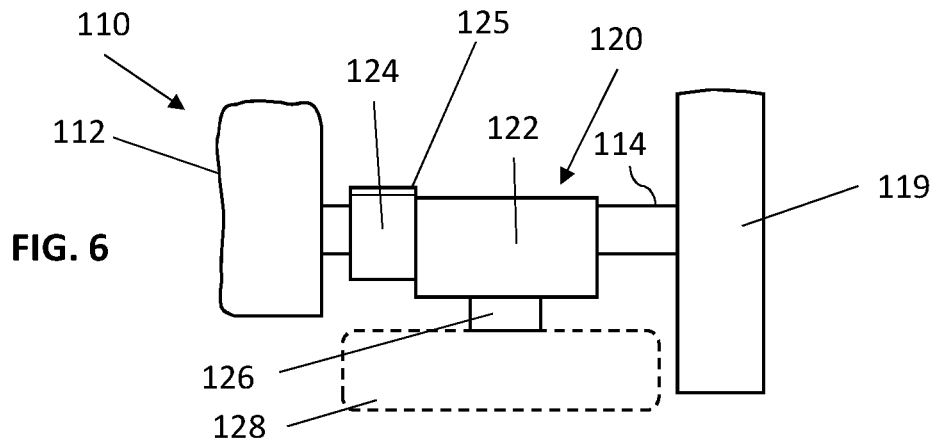
FIG. 6 is a schematic top-view diagram of a VCM installed onto a reference frame of a vehicle platform, according to an embodiment of the disclosed technology.

Reference is now made to FIG. 6, which is a schematic top-view diagram of a VCM 120 installed onto a reference frame 112 (shown partially) of a vehicle platform 110, according to an embodiment of the disclosed technology. In the embodiment of FIG. 6, reference frame 112 includes, as VCM-connection interface, a bar 114 extending outwardly from reference frame 112. In some embodiments, bar 114 extends from reference frame 112 to a bumper 119 of the vehicle platform. Bar 114 may have a circular cross-section, a polygonal cross-section, or any other suitable cross-section.

VCM 120 includes a sub-frame 122 having a wheel-hub assembly 126 connectable to a wheel 128. Sub-frame 122 includes, as vehicle-connection interface, a clamp 124 having a clamping surface adapted to be clamped onto, or about, bar 114. A cross-section of the clamping surface of clamp 124 typically corresponds in shape to the cross section of bar 114. In some embodiments, clamp 124 may be secured to bar 114 by bolts or fasteners. In other embodiments, clamp 124 may include two portions, which may be secured to each other, or tightened, by bolts or fasteners.

Figure 7A:
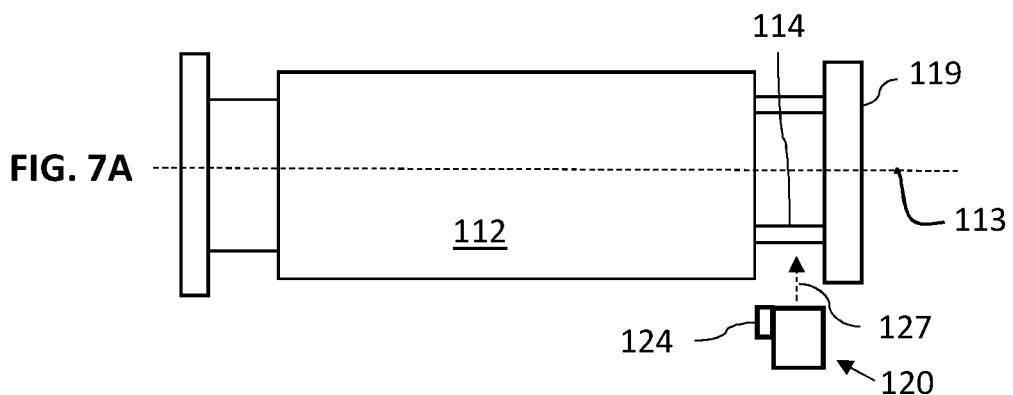
FIGS. 7A, 7B, and 7C are schematic top-view diagrams of steps of installation of the VCM of FIG. 6 onto the reference-frame of the vehicle platform, according to one installation method.
Figure 7B:
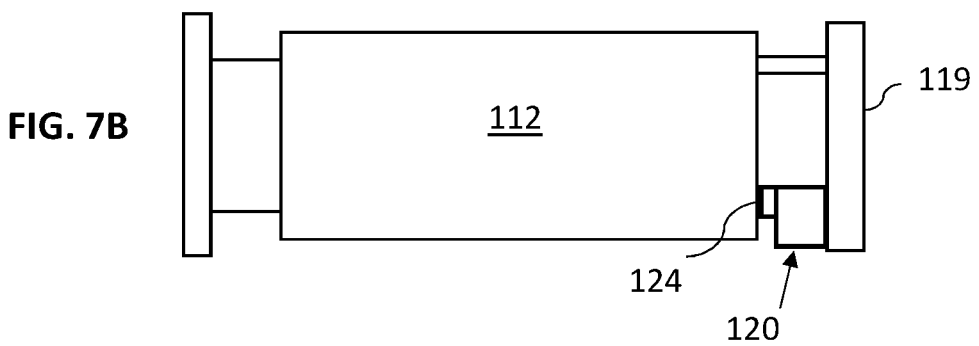
Figure 7C:
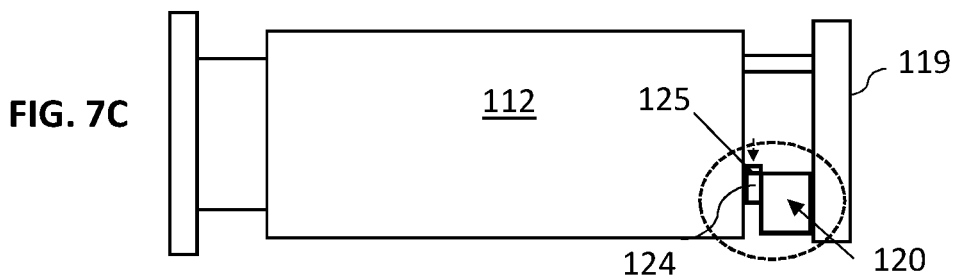

Reference is now additionally made to FIGS. 7A, 7B, and 7C, which are schematic top-view diagrams of steps of installation of VCM 120 of FIG. 6 onto reference-frame 112, according to one installation method.

As seen in FIGS. 7A to 7C, bar 114 extends between reference frame 112 and bumper 119, which may be attached to bar 114 prior to installation of the VCM. VCM 120 is aligned with bar 114, as shown in FIG. 7A, such that a height of clamp 124 is substantially equal to a height of bar 114. VCM 120 is then moved in a horizontal plane, substantially without changing the height of clamp 124, and in a lateral direction 127, perpendicular (or substantially perpendicular) to a longitudinal axis 113 of reference frame 112, until clamp 124 engages bar 114, as shown in FIG. 7B. Clamp 124 is then secured to bar 114 by a suitable securing mechanism, such as clamp closure 125, in FIG. 7C. It is appreciated that although FIGS. 7A to 7C illustrate attachment of VCM 120 to a front portion of reference frame 112, the VCM may be similarly attached to a rear portion of the reference frame.

It is appreciated that, in the embodiment of FIGS. 7A to 7C, bumper 119 may be omitted from vehicle platform 110. In such embodiments, VCM 120 would be connected to bar 114 and clamped thereto, as described herein. In some embodiments, bumper 119 is secured to VCM 120 after the VCM is secured to reference frame 112.

Figure 8A:
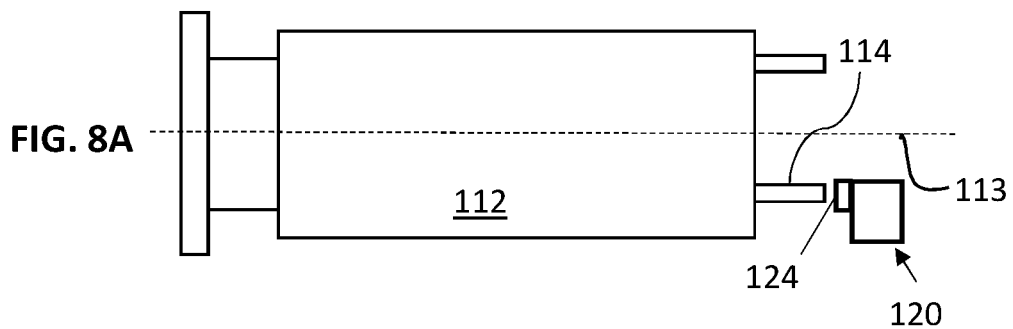
FIGS. 8A, 8B, and 8C are schematic top-view diagrams of steps of installation of the VCM of FIG. 6 onto the reference-frame of the vehicle platform, according to another installation method.
Figure 8B:
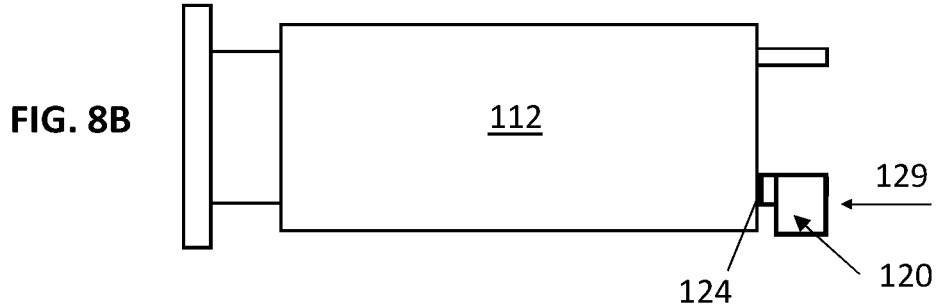
Figure 8C:
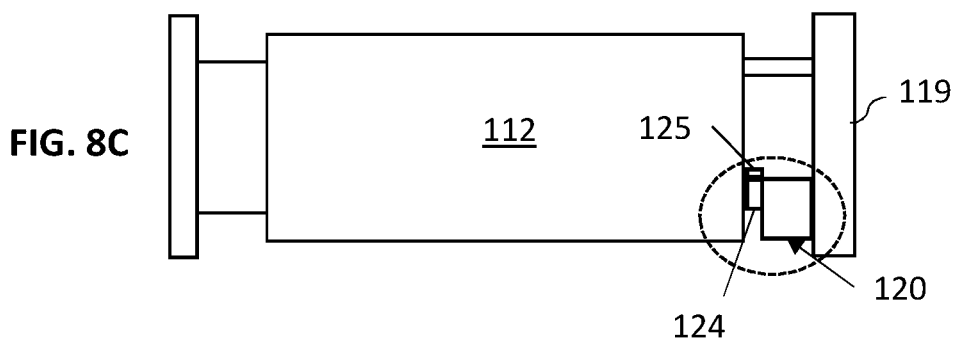

Turning now to FIGS. 8A, 8B, and 8C, these are schematic top-view diagrams of steps of installation of VCM 120 of FIG. 6 onto reference-frame 112, according to another installation method. As seen, in the embodiment of FIGS. 8A to 8C, bar 114 extends from reference frame 112, but bumper 119 is not yet attached to the bar or to the reference frame.

In FIG. 8A, VCM 120 is aligned with bar 114, such that a height of clamp 124 is substantially equal to a height of bar 114, and clamp 124 is aligned with an end of bar 114. VCM 120 is then moved in a horizontal plane, substantially without changing the height of clamp 124, and in a longitudinal direction 129 parallel to longitudinal axis 113 of reference frame 112, until clamping surface of clamp 124 is positioned on bar 114, as shown in FIG. 8B. Clamp 124 is then secured to bar 114 by a suitable securing mechanism, such as clamp closure 125, in FIG. 8C. In some embodiments, bumper 119 may be mounted onto the end of bar 114, following installation of VCM 120 and clamping of clamp 124. Such installation of bumper 119 may further reinforce the attachment of VCM 120 to reference frame 112, and secure VCM 120 to reference frame 112. However, the method of FIGS. 8A to 8C is equally applicable when no bumper is used, simply by ensuring that the clamping of the VCM to the reference frame is secure.

It is appreciated that although FIGS. 8A to 8C illustrate attachment of VCM 120 to a front portion of reference frame 112, the VCM may be similarly attached to a rear portion of the reference frame.

In some embodiments, the opening of clamp 124 may be slightly larger in diameter, or in at least one cross-section, from a cross sectional dimension of bar 114. In such embodiments, the connection of the VCM 120 to reference frame 112 is adjustable, for example to control or adjust any one of the caster angle of the wheel, the camber angle of the wheel, and the toe angle of the wheel. A circular cross-section of the bar and/or clamping surface of clamp 124 may allow a rotational motion to adjust the camber angle. A polygonal cross-section of the bar and/or clamping surface of clamp 124 may allow adjusting of the camber within pre-defined set of angles. Adjusting of a toe and/or caster may be possible by fitting clamp 124 with respect to bar 114 (e.g. when having some gap and degree of freedom between the surfaces of both).

Figure 9:
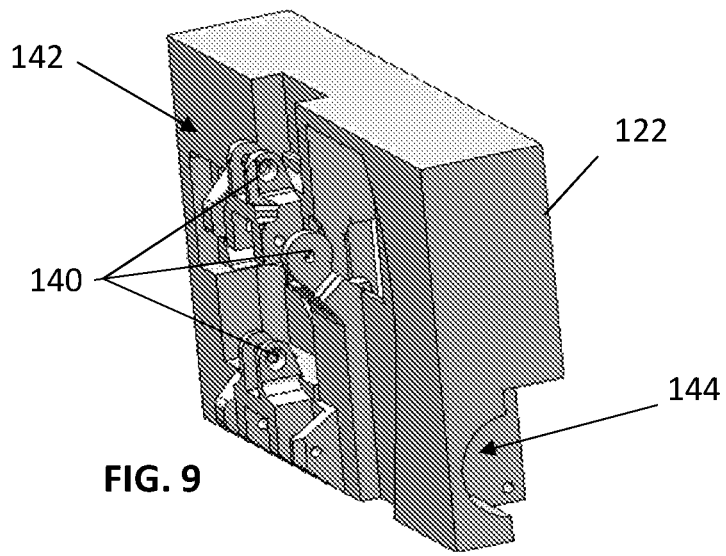
FIG. 9 is a perspective view illustration of a portion of a VCM suitable for connection to a reference-frame of a vehicle platform in accordance with the methods of FIGS. 7A to 8C.
Figure 10A:
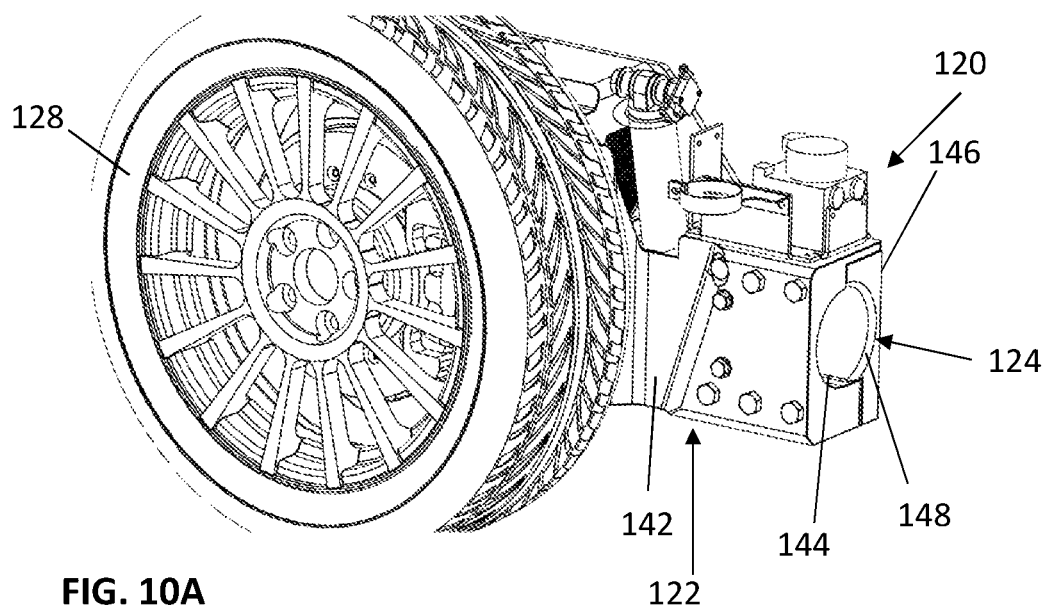
FIGS. 10A and 10B are perspective view illustrations of a VCM suitable for connection to a reference-frame of a vehicle platform in accordance with the methods of FIGS. 7A to 8C, and including the portion of FIG. 9.
Figure 10B:
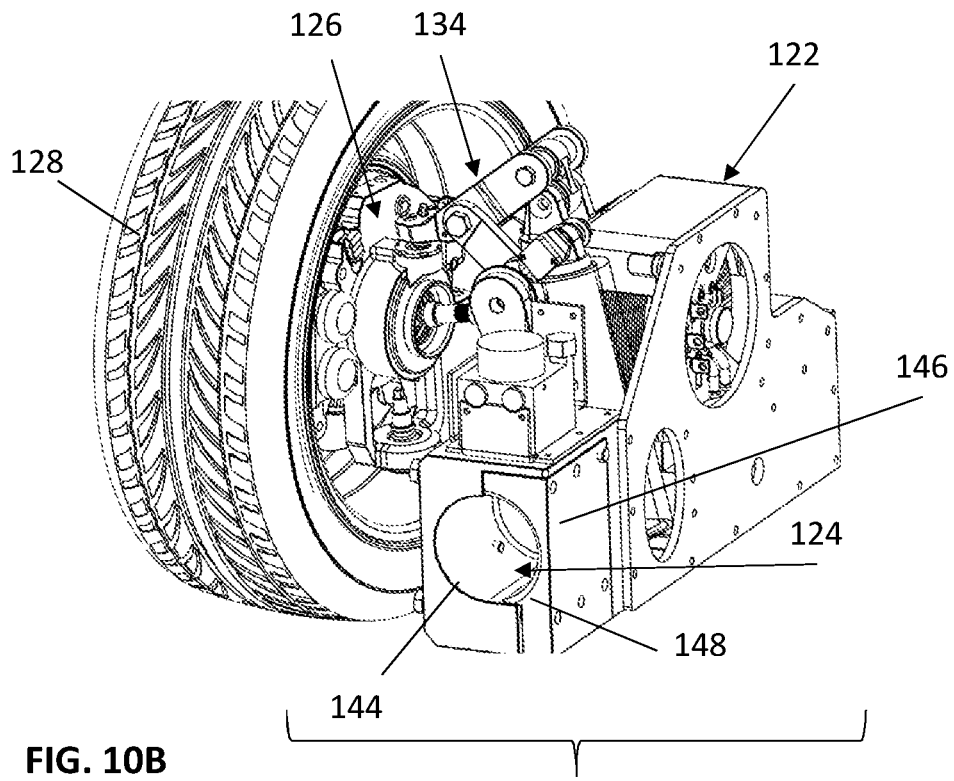

Reference is now made to FIG. 9, which is a perspective view illustration of a portion of a VCM 120 suitable for connection to reference-frame 112 of vehicle platform 110 in accordance with the methods of FIGS. 7A to 8C, and to FIGS. 10A and 10B, which are perspective view illustrations of VCM 120 including the portion of FIG. 9.

As seen in FIG. 9, a sub-frame 122 of a VCM 120 includes a plurality of connection points 140 connected to a portion 142. Sub-frame 122 includes a semi-circular opening portion 144 forming a first half of clamp connector 124. As seen in FIGS. 10A and 10B, VCM 120 further includes wheel-hub assembly 126 having mounted thereon wheel 128. Sub-frame 122 includes, in addition to portions 142 and 144 shown in FIG. 9, a corresponding clamp connector portion 146 including a second semi-circular surface 148, which, together with opening portion 144, forms clamp 124. Clamp 124 is disposed on a side of sub-frame 122, and is easily accessible for connection to a corresponding VCM-connection interface 114 of the vehicle platform.

As seen clearly in FIG. 10B, suspension assembly 134 extends between sub-frame 122 and wheel-hub assembly 126. More specifically, suspension assembly 134 extends between clamp 114, which forms the vehicle-connection assembly of sub-frame 122, and wheel-hub assembly 126.

Figure 11A:
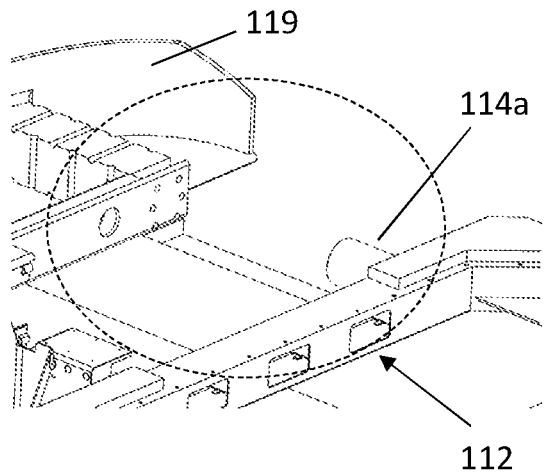
FIGS. 11A, 11B, 11C, and 11D are perspective view illustrations of steps of installing VCMs as shown in FIGS. 10A and 10B onto a reference frame of a vehicle platform.
Figure 11B:
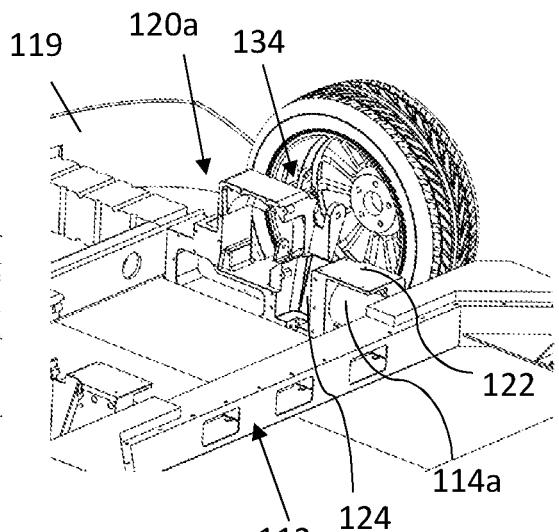
Figure 11C:
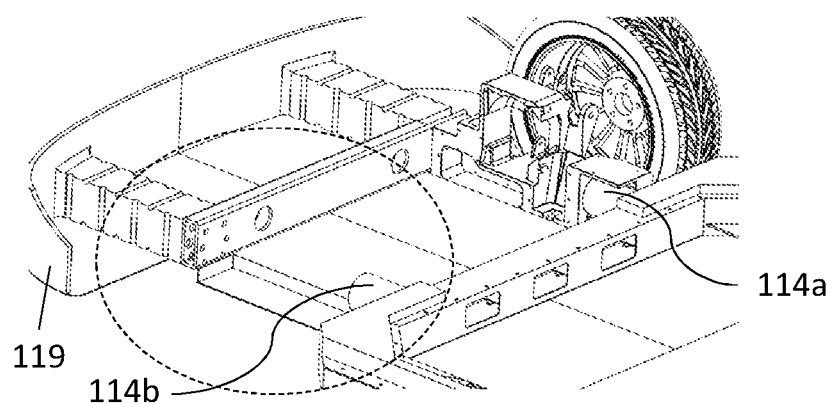
Figure 11D:
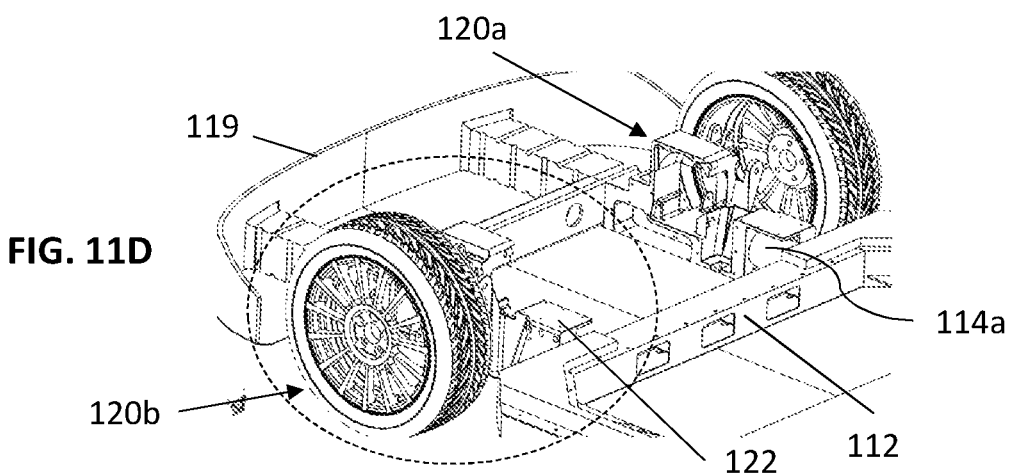

Reference is now additionally made to FIGS. 11A, 11B, 11C, and 11D, which are perspective view illustrations of steps of installing VCMs as shown in FIGS. 10A and 10B onto a reference frame 112 of a vehicle platform. FIGS. 11A and 11B are steps of connecting a first VCM 120a to the reference frame 112, and FIGS. 11C and 11D are steps of connecting a second VCM 120b to the reference frame, opposite the first VCM 120a.

As seen in FIG. 11A, reference frame 112 includes a first bar 114a extending outwardly therefrom, toward a bumper 119. In the illustrated embodiment, bar 114a does not span the entire length between the reference frame and the bumper, and is a relatively short bar. Turning to FIG. 11B, it is seen that VCM 120a is placed onto bar 114a, such that clamp 124 of the VCM is engaged with the bar and is secured thereto, and a portion of bar 114a is exposed behind sub-frame 122. The configuration shown in FIG. 11B is typically prior to installation of the opposing clamp portion clamp 124, and to closure of the clamp with the clamp closure 125 (FIG. 6). Typically, VCM 120a may be installed using the method of FIGS. 7A-7C, or the method of FIGS. 8A-8C, or a combination thereof. However, regardless of the method used, the first step of installation of the VCM 120a is to align the clamp 124 at the height of bar 114a, and then move the VCM while maintaining the height alignment of the clamp 124.

Similarly, as seen in FIG. 11C, reference frame 112 includes a second bar 114b extending outwardly therefrom, toward a bumper 119, substantially parallel to bar 114a. In the illustrated embodiment, bar 114b does not span the entire length between the reference frame and the bumper, and is a relatively short bar. Turning to FIG. 11D, it is seen that VCM 120b is placed onto bar 114b, substantially as described hereinabove with respect to FIGS. 11A and 11B.

Figure 12:
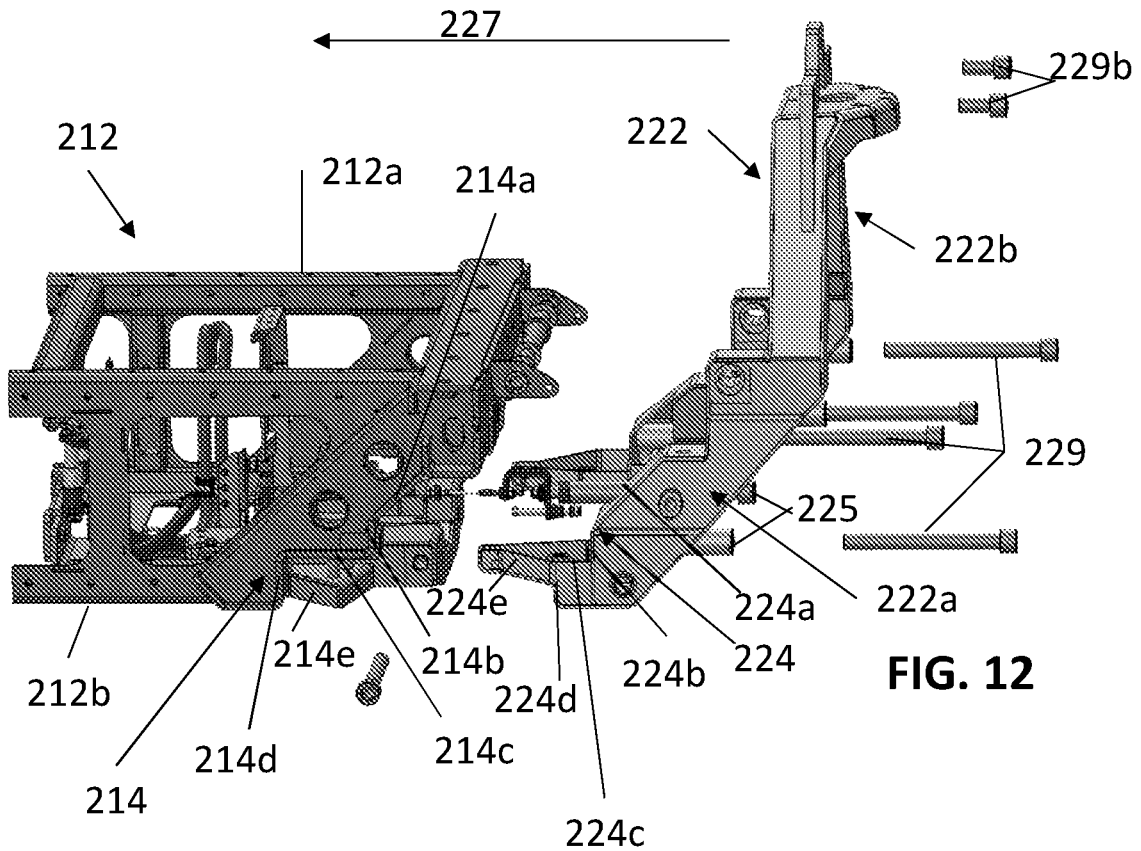
FIG. 12 is a perspective view illustration of a sub-frame of a VCM and a reference frame of a vehicle platform, detached from one another, according to some embodiments of the disclosed technology.
Figure 13A:
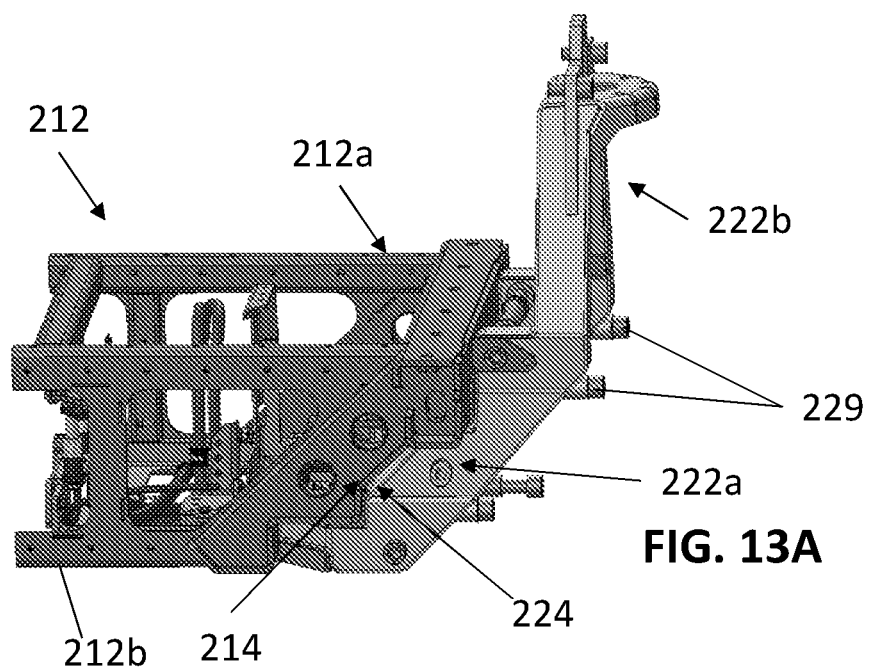
FIGS. 13A and 13B are perspective view illustrations of the sub-frame and reference-frame of FIG. 12, when connected to each other.
Figure 13B:
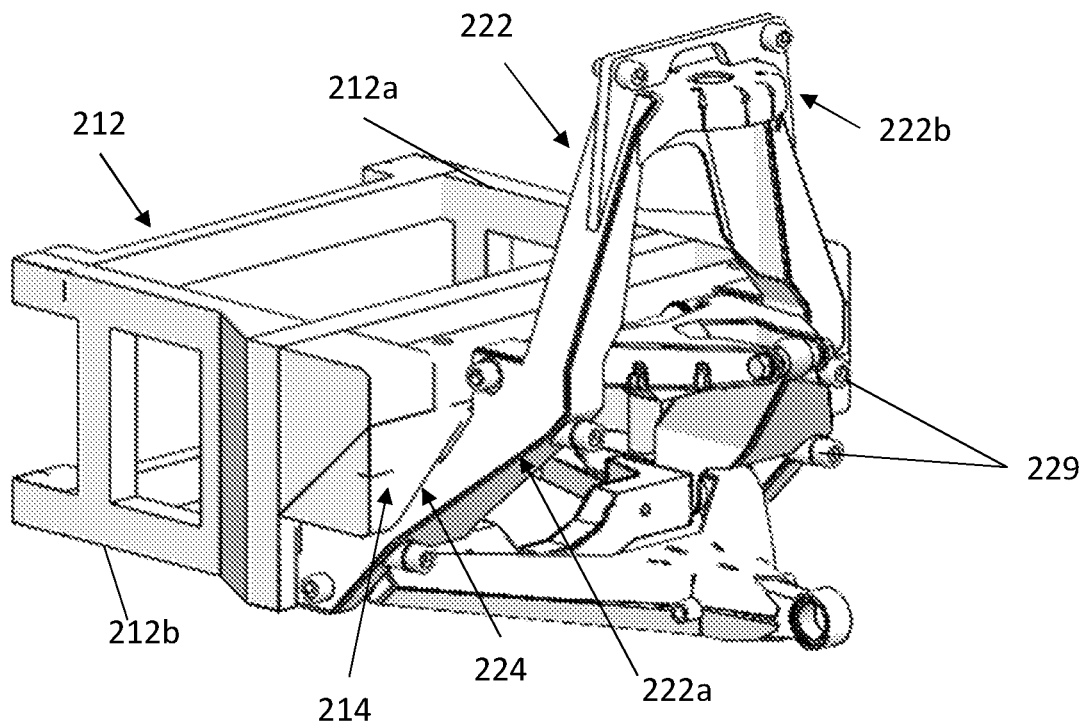

Reference is now made to FIG. 12, which is a perspective view illustration of a sub-frame 222 of a VCM 220 and a reference frame 212 of a vehicle platform 210, prior to installation of the VCM. Reference is further made to FIGS. 13A and 13B, which are perspective view illustrations of sub-frame 222 and reference-frame 212 of FIG. 12, when connected to each other.

As seen in the example embodiment of FIGS. 12-13B, reference-frame 212 includes an upper surface 212a and a lower surface 212b. A VCM-connection interface 214 of reference-frame 212 is disposed between the upper and lower surfaces of the reference frame, and includes a slanted surface 214a, a substantially vertical surface 214b, a substantially horizontal surface 214c, and a second substantially vertical surface 214d. The VCM-connection interface 214 may, in some embodiments, terminate in a leaf 214e suitable for snap fit engagement of the sub-frame, as explained herein. Reference frame 212 additionally includes a plurality of bores, adapted to receive fasteners 229, as explained herein.

Sub-frame 222 includes a first portion 222a which is adapted to be aligned with, and to fit between, the upper and lower surfaces of the reference frame 212. Vehicle-connection interface 224 of sub-frame 222 is included within the first portion. In some embodiments, sub-frame 222 includes a second portion 222b adapted to extend above the upper surface 212a of the reference frame, and may be connected to other portions of the vehicle, as explained in further detail hereinbelow. Vehicle-connection interface 224 of sub-frame 222 includes surfaces corresponding to surfaces of VCM-connection interface 214 of the reference frame. As shown in the example embodiment of FIGS. 12-13B, vehicle-connection interface 224 includes a slanted surface 224a, a substantially vertical surface 224b, a substantially horizontal surface 224c, and a second substantially vertical surface 224d. Vehicle-connection interface 224 may, in some embodiments, terminate in a substantially horizontal protrusion 224e adapted for snap fit engagement with leaf 214e, as explained herein. First portion 222a of sub-frame 222 further includes a plurality of bores 225, adapted to be aligned with bores 215 of reference frame 212, and to receive fasteners 229 therein for connection of reference-frame 212 and sub-frame 222, as explained herein.

As seen in FIGS. 13A and 13B, sub-frame 222 is connected to reference frame 212 by aligning surfaces of vehicle-connection interface 224 with corresponding surfaces of VCM-connection interface 214, and then moving sub-frame 224 laterally in a direction 227, without changing the height of vehicle-connection interface 224, until surfaces 214a. 214b, 214c, and 214d engage corresponding surfaces 224a, 224b, 224c, and 224d, respectively. In some embodiments, in this orientation, leaf 214e is in snap-fit engagement with protrusion 224e. At this stage, bores 215 and 225 are aligned, and fasteners 229 are inserted into aligned bores 215 and 225, thereby to reinforce the connection of reference-frame 212 and sub-frame 222.

It is a particular feature of the embodiment of FIGS. 12 to 13B, that the vehicle-connection interface of sub-frame 222 is disposed entirely between the upper and lower surfaces of reference frame 212, such that at least some subsystems mounted onto sub-frame 222 may be disposed within the reference frame, as explained in further detail hereinbelow.

Figure 14A:
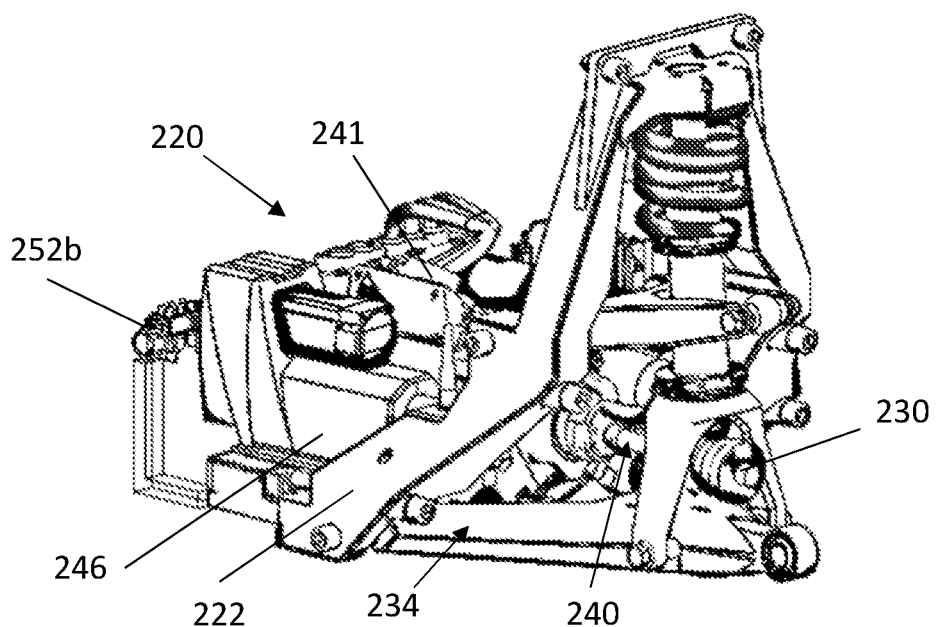
FIGS. 14A and 14B are, respectively, a perspective view illustration and a side view planar illustration of the VCM including the sub-frame of FIGS. 12 to 13B, and including subsystems thereof, where in FIG. 14B the sub-frame is installed on the reference-frame.
Figure 14B:
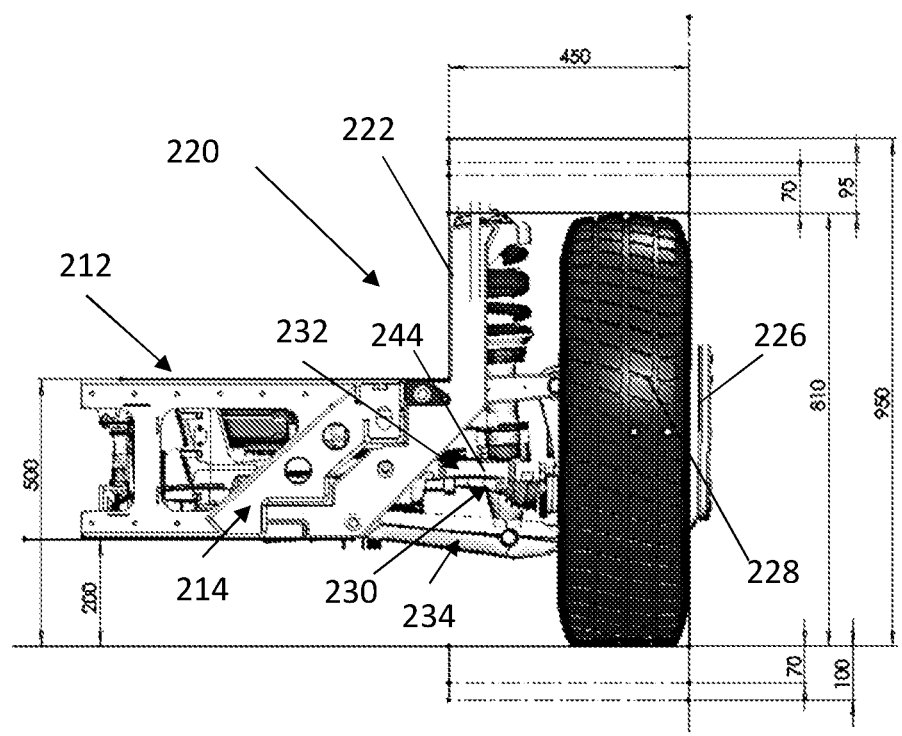

Reference is now additionally made to FIGS. 14A and 14B, which are, respectively, a perspective view illustration and a side view planar illustration of VCM 220 including sub-frame 222 of FIGS. 12 to 13B, and including subsystems thereof, where in FIG. 14B sub-frame 222 is installed on reference-frame 212. As seen, VCM 220 includes a wheel-hub assembly 226, a drive subsystem 230, including a drive-shaft 240 and a motor 241. A suspension subsystem 234 is mounted onto sub-frame 222 and extends toward wheel-hub assembly 226.

A steering subsystem 232, includes a steering rod 244 (shown in FIG. 14B) disposed between sub-frame 212 and wheel-hub assembly 226, and a steering actuator 246 (shown in FIG. 14A) disposed within reference frame 212, when sub-frame 222 and reference frame 212 are connected. In some embodiments, a braking subsystem is also attached to sub-frame 222 and disposed within reference frame 212, when the sub-frame and reference frame are connected.

A VCM-portion 252b of a multi-interface connection-element 50 (FIG. 2) is mounted onto sub-frame 222 whether directly or by being mounted onto another subsystem mounted onto the sub-frame. When connecting VCM 220 to reference-frame 212, VCM portion 252b is adapted to be connected to a corresponding portion of the multi-interface connection-element (not explicitly shown), as described hereinabove with respect to FIGS. 2 to 5.

Figure 15:
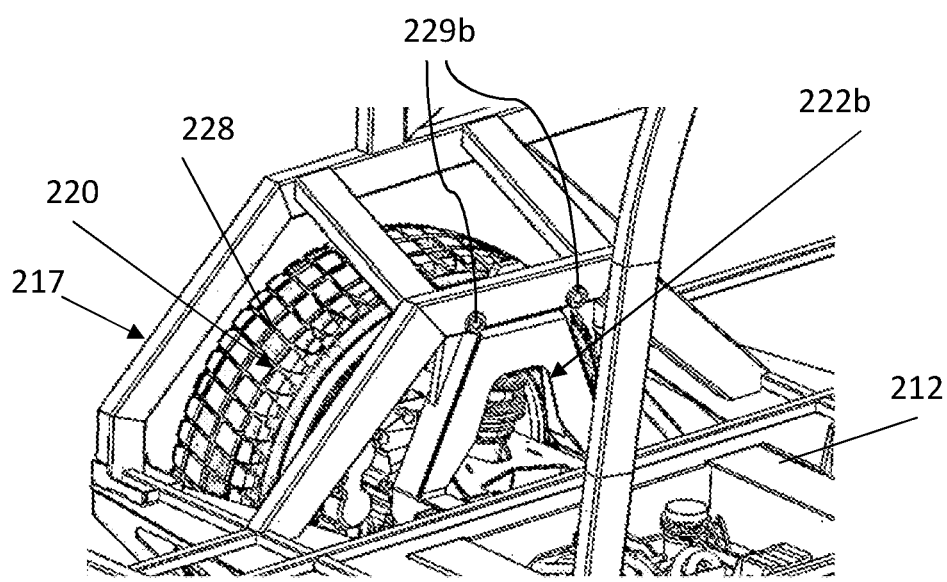
FIG. 15 is a partial perspective view of an additional connection of the sub-frame of the VCM to a portion of the reference frame of the vehicle platform, according to some embodiments of the disclosed technology.

Reference is now additionally made to FIG. 15, which is a partial perspective view of an additional connection of sub-frame 222 of VCM 220 to a portion of reference frame 212 of vehicle platform 210. As seen, in the illustrated embodiment, reference frame 212 further includes a top-hat construction 217, adapted to envelop wheel 228, when VCM 220 is connected reference frame 212. In the illustrated embodiment, second portion 222b of sub-frame 222 includes a plurality of bores 225b, and top-hat construction 217 includes a plurality of bores 215b. When bores 215b and 225b are aligned, fasteners or bolts 229b are inserted into the aligned bores, thereby connecting second portion 222b of sub-frame 222 to top-hat construction 217.

Figure 16A:
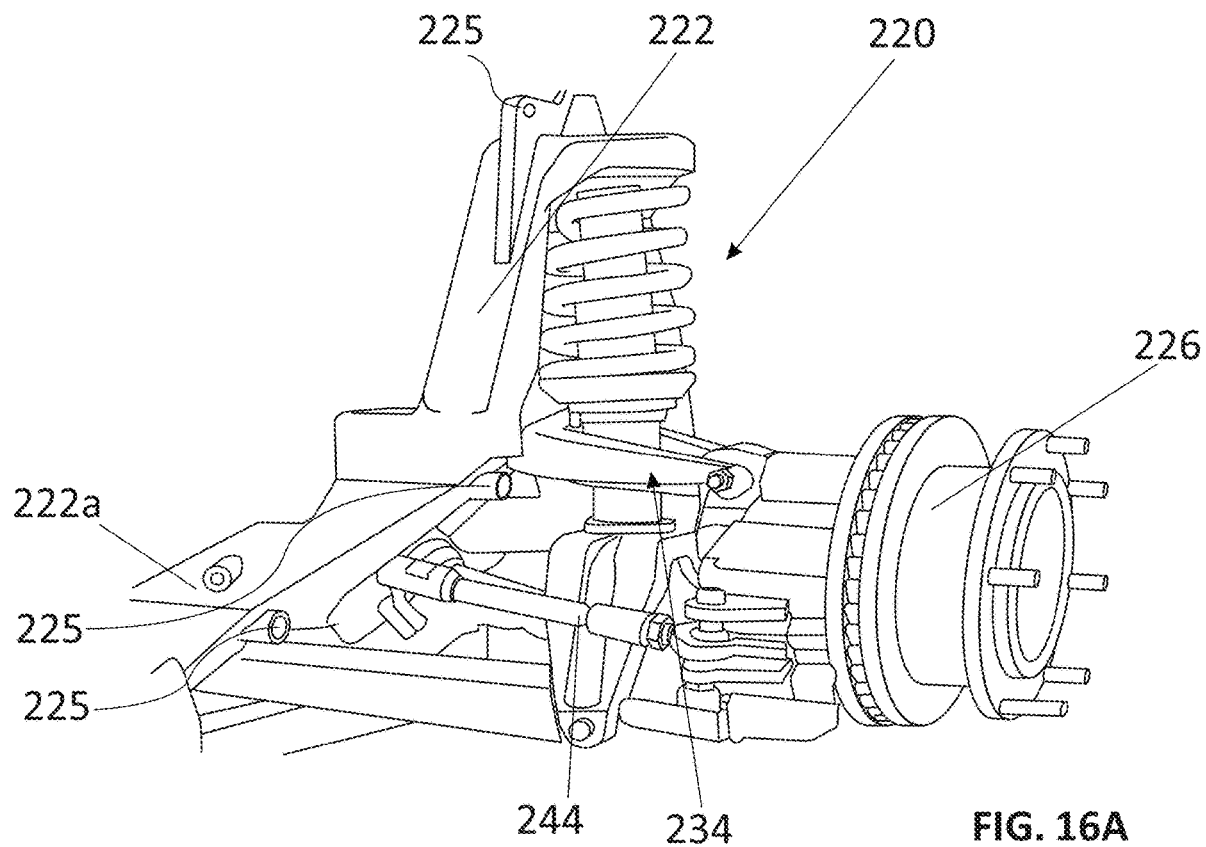
FIGS. 16A and 16B are photographs of the VCM of FIGS. 14A and 14B, prior to installation thereof on the reference frame.
Figure 16B:
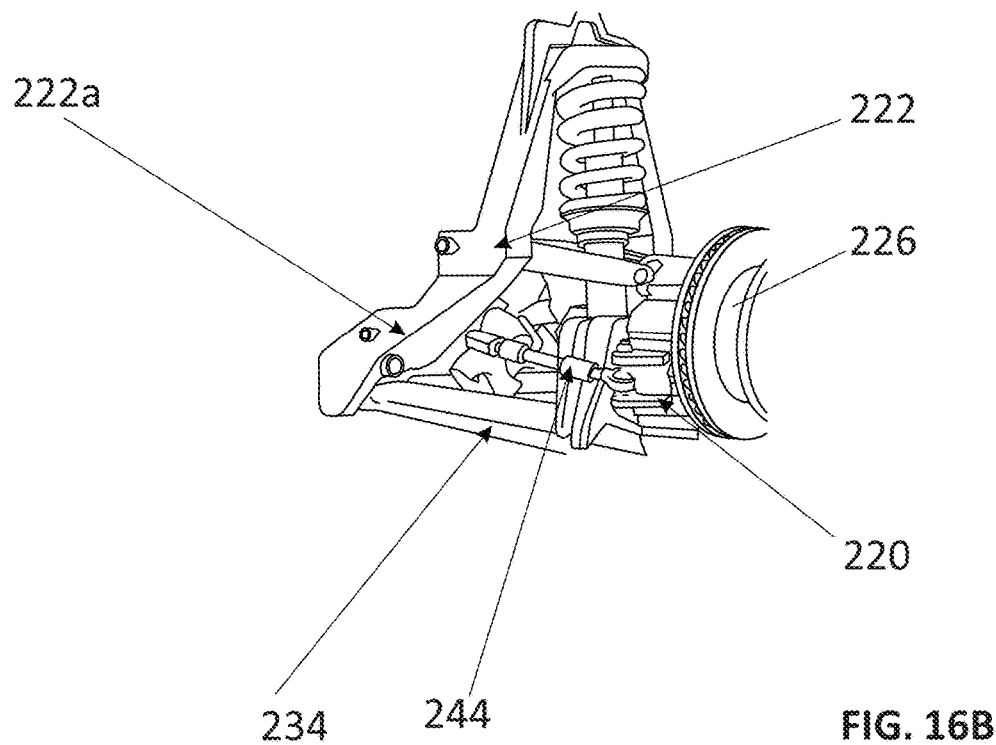
Figure 17A:
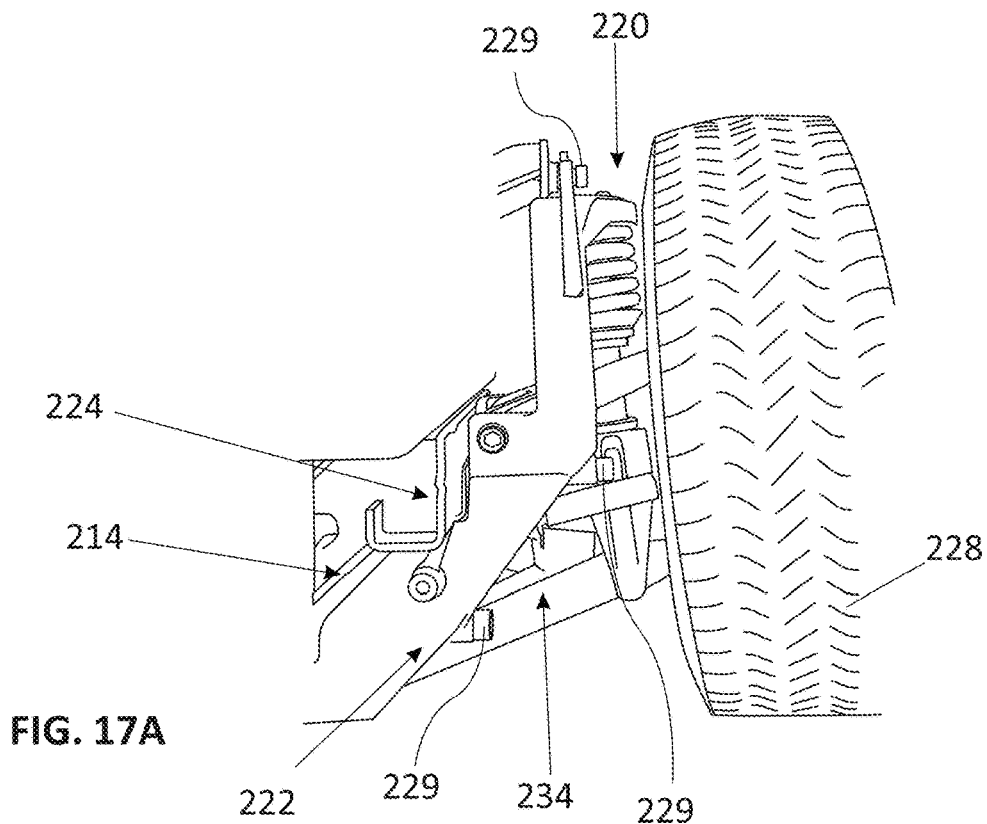
FIGS. 17A, 17B, 17C, and 17D are photographs of the VCM of FIGS. 14A and 14B following installation thereof on the reference frame.
Figure 17B:
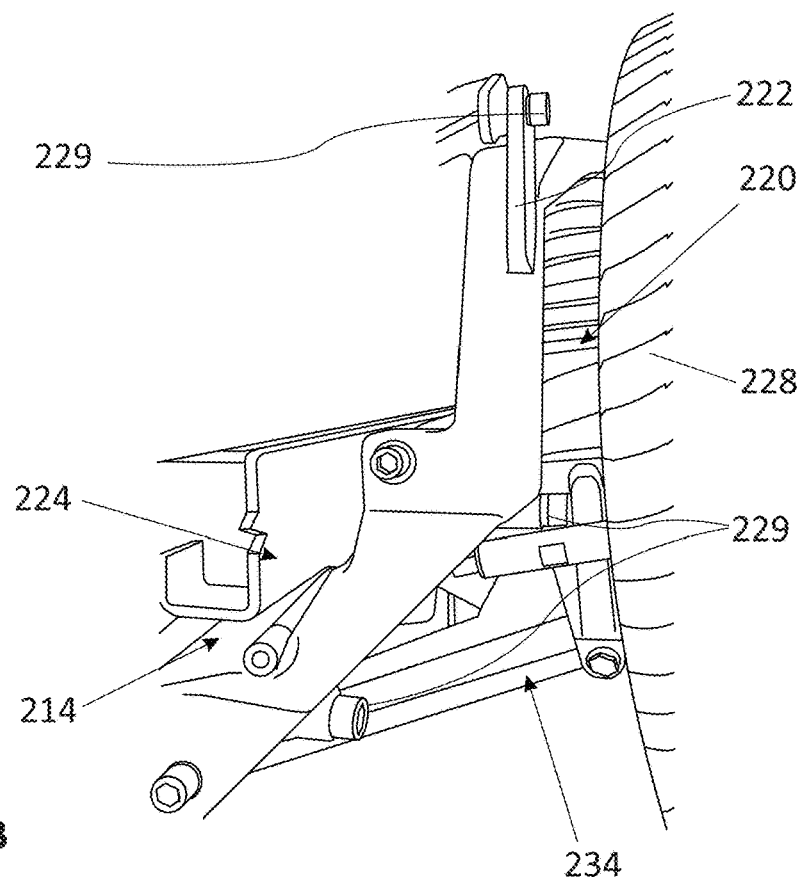
Figure 17C:
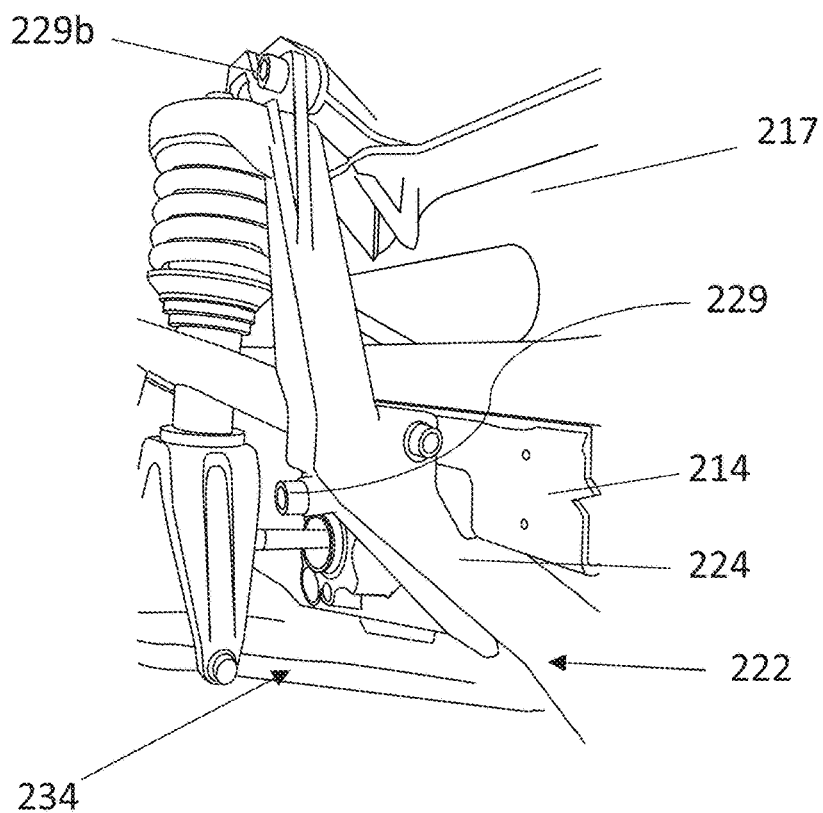
Figure 17D:
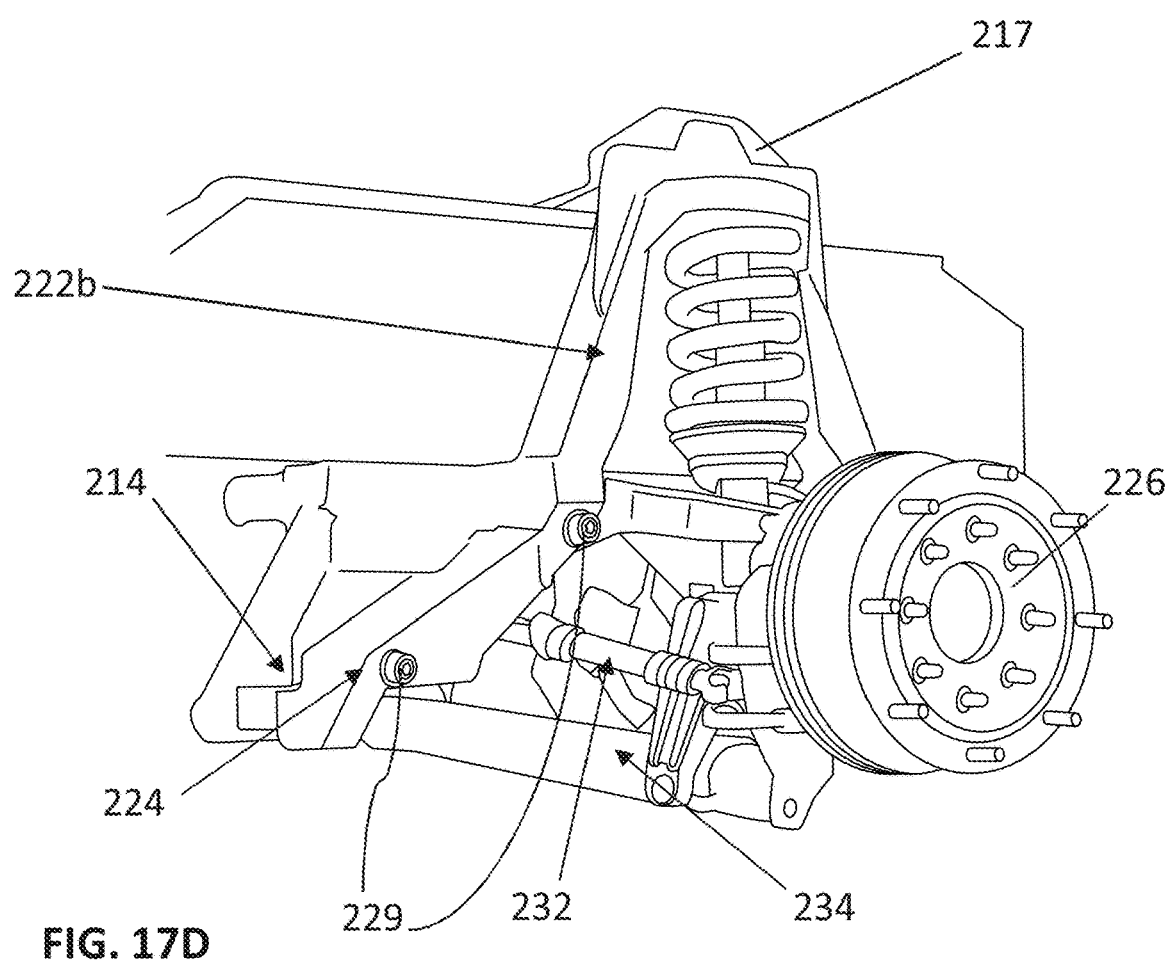

FIGS. 16A and 16B are photographs of VCM 220, prior to installation thereof on reference frame 212, and FIGS. 17A, 17B, 17C, and 17D are photographs of VCM 220 following installation thereof on reference frame 212. Reference numerals used in FIGS. 16A to 17D correspond to those described hereinabove with respect to FIGS. 12 to 15.

Figure 18:
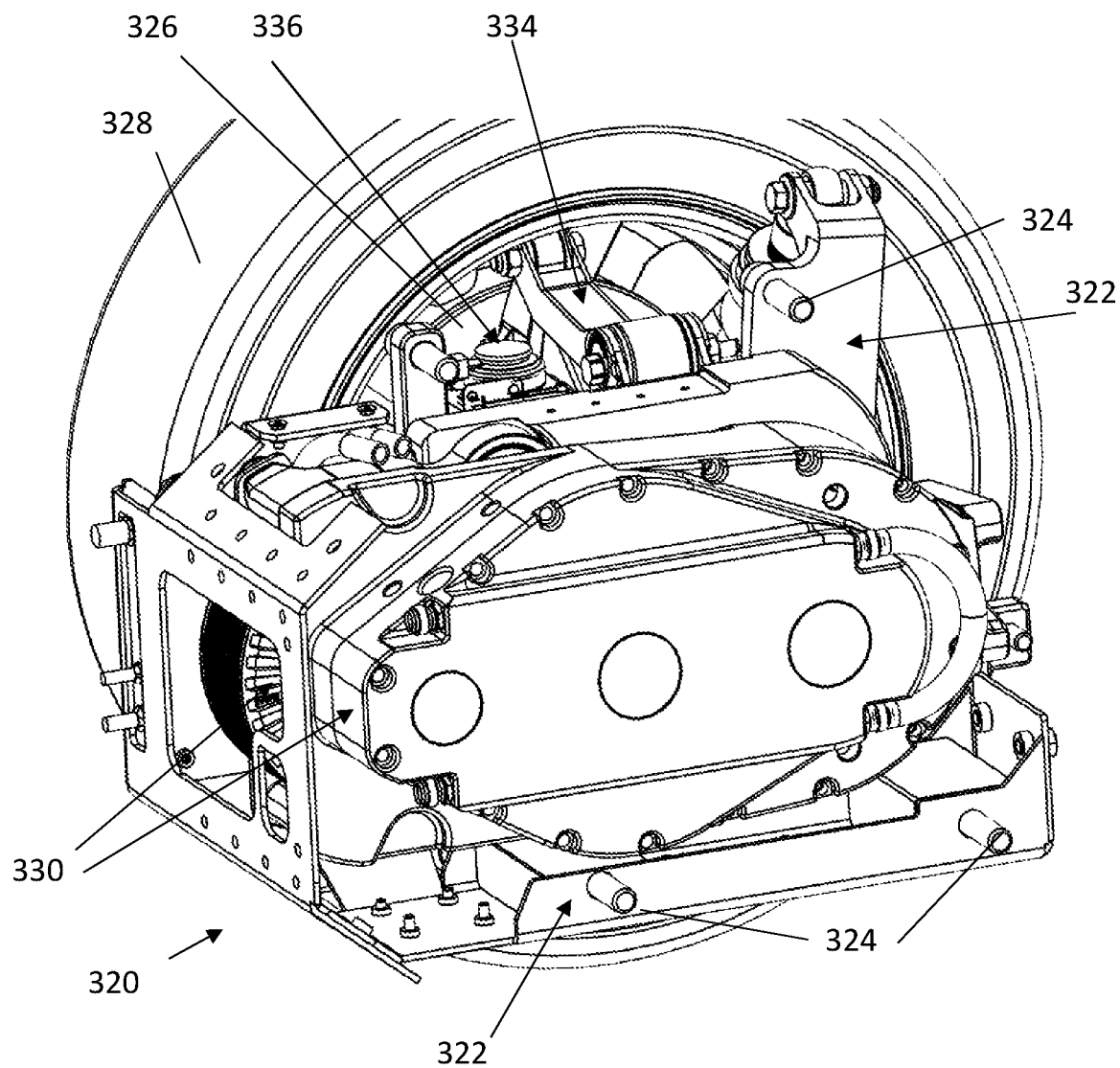
FIG. 18 is a perspective view illustration of a VCM according to another embodiment of the disclosed technology.
Figure 19A:
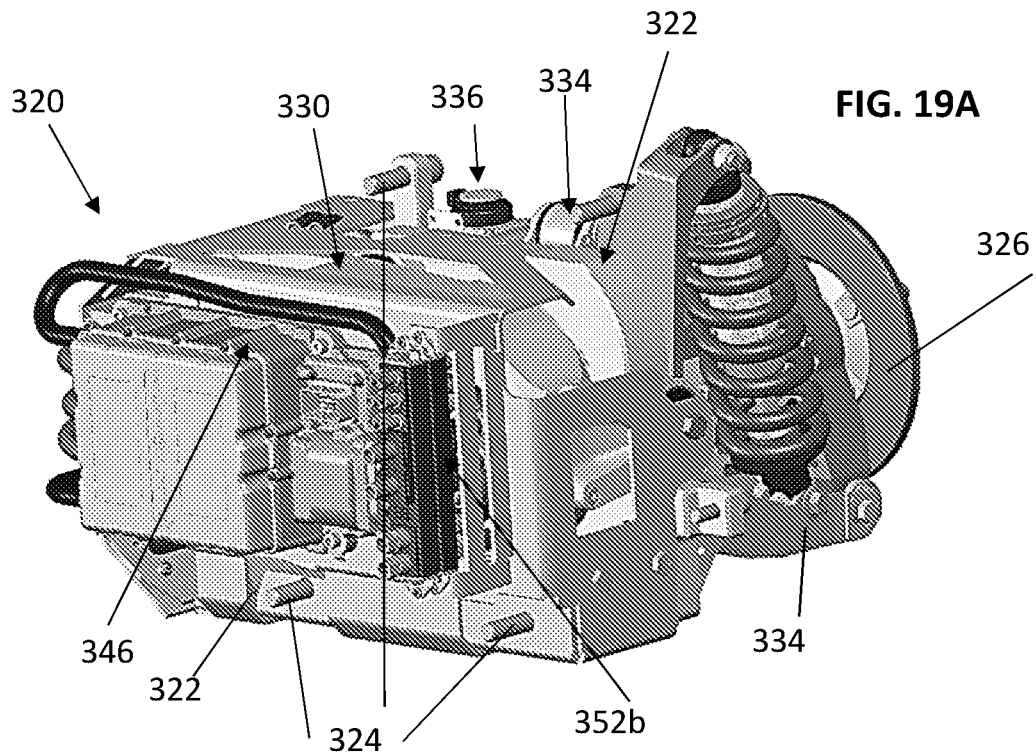
FIGS. 19A, 19B, and 19C are perspective view illustrations and a front view planar illustration of a VCM similar to the VCM of FIG. 18.
Figure 19B:
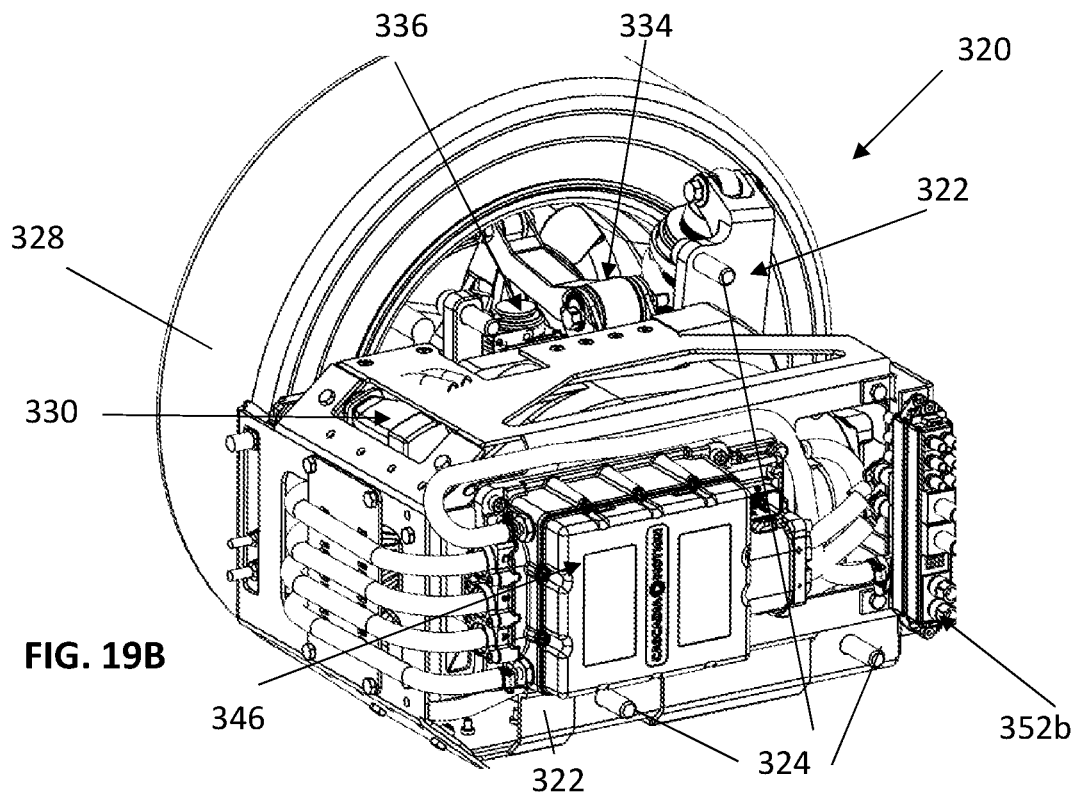
Figure 19C:
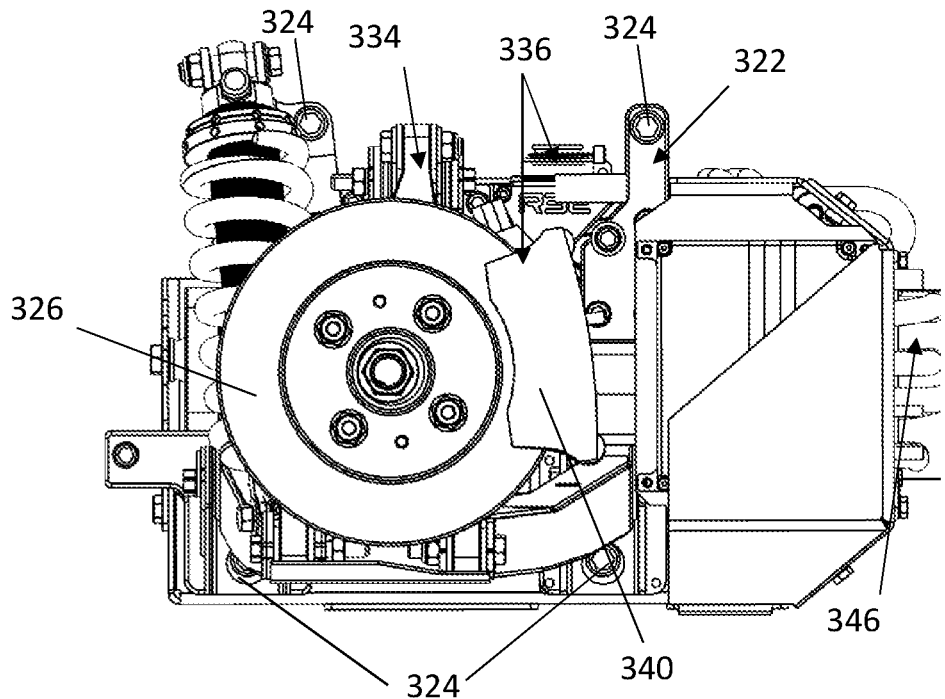

Reference is now made to FIG. 18, which is a perspective view illustration of a VCM 320 according to another embodiment of the disclosed technology, the VCM having some portions removed therefrom. Reference is further made to FIGS. 19A, 19B, and 19C, which are, respectively, two perspective view illustrations and a front view planar illustration of VCM 320. In the context of the following description, the 'front' of the VCM is the portion thereof on which the wheel is mounted, and the 'back' of the VCM is the portion thereof distal to the wheel.

As seen in FIGS. 18 to 19C. VCM 320 includes sub-frame 322, having a plurality of fasteners or bolts 324 extending therefrom, the fasteners forming the vehicle-connection interface of VCM 320. VCM 320 includes a wheel-hub assembly 326, illustrated with wheel 328 mounted thereon. As seen clearly in FIG. 18, all the fasteners 324 and corresponding bores 314 in which they are received (FIG. 20), as described herein, are within a cylindrical footprint of wheel 328, and as such the entire vehicle-connection interface of VCM 320 is within the cylindrical footprint of the wheel.

A suspension subsystem 334 is attached to wheel-hub assembly 326 as well as to sub-frame 322. A braking subassembly 336 is also attached to sub-frame 322, and includes a brake caliper 340 coupled to wheel-hub assembly 326. A drive subassembly 330, which typically includes a motor and a drive-shaft, is attached to a sub-frame 322 and extends between a back portion of VCM 320 and wheel hub assembly 326. In some embodiments, such as that shown in FIG. 18, VCM 320 may be devoid of a steering subassembly.

As seen in FIGS. 19A to 19C, VCM 320 includes a cooling subsystem 346. Cooling subsystem 346 may be used to cool the motor. In some embodiments, cooling subsystem 346 is mounted onto sub-frame 322, near a back portion of VCM 320, here shown as being mounted over, or behind, drive subassembly 330. Cooling subsystem 346 is connected by suitable tubing to coolant connection interfaces of a VCM-portion 352b of a multi-interface connection-element as described hereinabove with respect to FIGS. 2 to 5.

As seen in FIG. 18, in VCM 320, the suspension subsystem 334 and the braking subsystem 336 are disposed between the sub-frame and the wheel-hub assembly. Additionally, the drive subsystem 330 is disposed substantially between the prongs 324 and the wheel. As such, in the embodiment of FIGS. 18 to 19C, the drive, suspension, and braking subsystems are all disposed between the wheel hub assembly and the vehicle-connection interface of the VCM.

Figure 20:
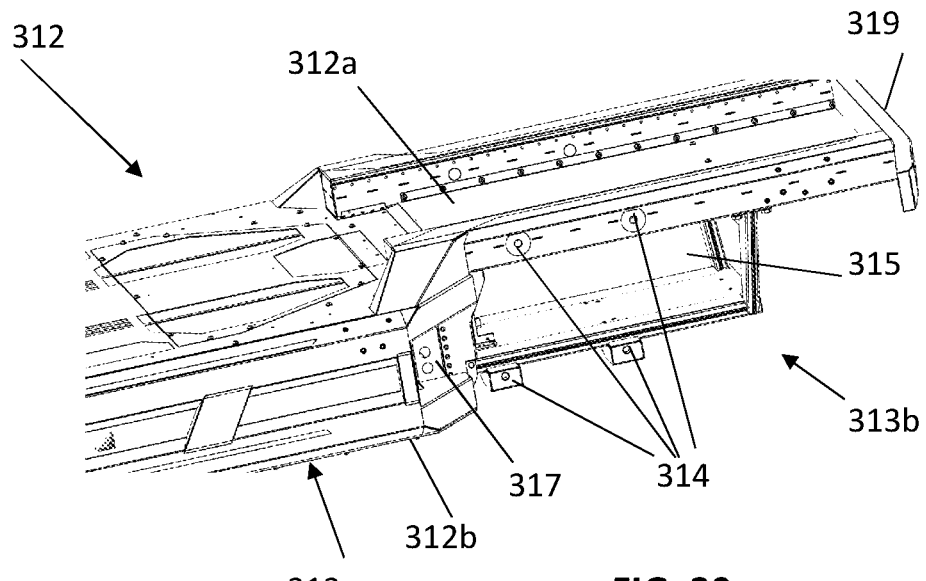
FIG. 20 is a perspective view illustration of a reference-frame of a vehicle platform, including a VCM-connection interface for connection to the VCM of FIG. 18.

Reference is now made to FIG. 20, which is a perspective cut view illustration of a rear or a front portion of reference-frame 312 adapted for connection to VCM 320 of FIGS. 18 to 19C. As seen in FIG. 20, either of the rear/front portion of reference frame 312 has an upper surface 312a and a lower surface 312b. Reference frame 312 is divided into a central portion 313a, and a VCM-receiving portion 313b, which can be either a rear or a front portion, optionally terminating in a bumper 319. A plurality of bores 314 are formed in side walls of VCM-receiving portion 313b, transversely to the upper and lower surfaces, thereby forming a VCM-connection interface for connection to VCM 320. In some embodiments, at least some of bores 314 may be perpendicular to the upper and/or lower surfaces. In some embodiments, at least some of bores 314 are not perpendicular to the upper and/or lower surfaces, but rather are angled relative to the upper and/or lower surfaces at an angle suitable to receive the fasteners 324 of sub-frame 322.

In some embodiments, fasteners 324 may be replaced by a corresponding plurality of prongs, which are adapted to be received within bores 314 and held therein by additional fasteners, not explicitly shown.

For connection of VCM 320 to reference frame 312, VCM 320 is aligned with VCM-receiving portion 313b such that fasteners 324 are aligned with bores 314. VCM 320 is then moved laterally toward reference frame 312, without changing the vertical alignment of the VCM, until fasteners 324 engage bores 314. In some embodiments, additional fasteners may be used to reinforce the connection of fasteners 324 within bores 314.

In some embodiments, in the attached configuration, some portions of VCM 320, such as cooling subsystem 346, may be disposed between the upper and lower surfaces of reference frame 312, for example within hollow 315. In some embodiments, a vehicle-platform-portion of the multi-interface connection-element, corresponding to VCM-portion 352b, may be mounted on reference frame 312, for example on strut or side wall 317 connecting the upper and lower surfaces.

Figure 21A:
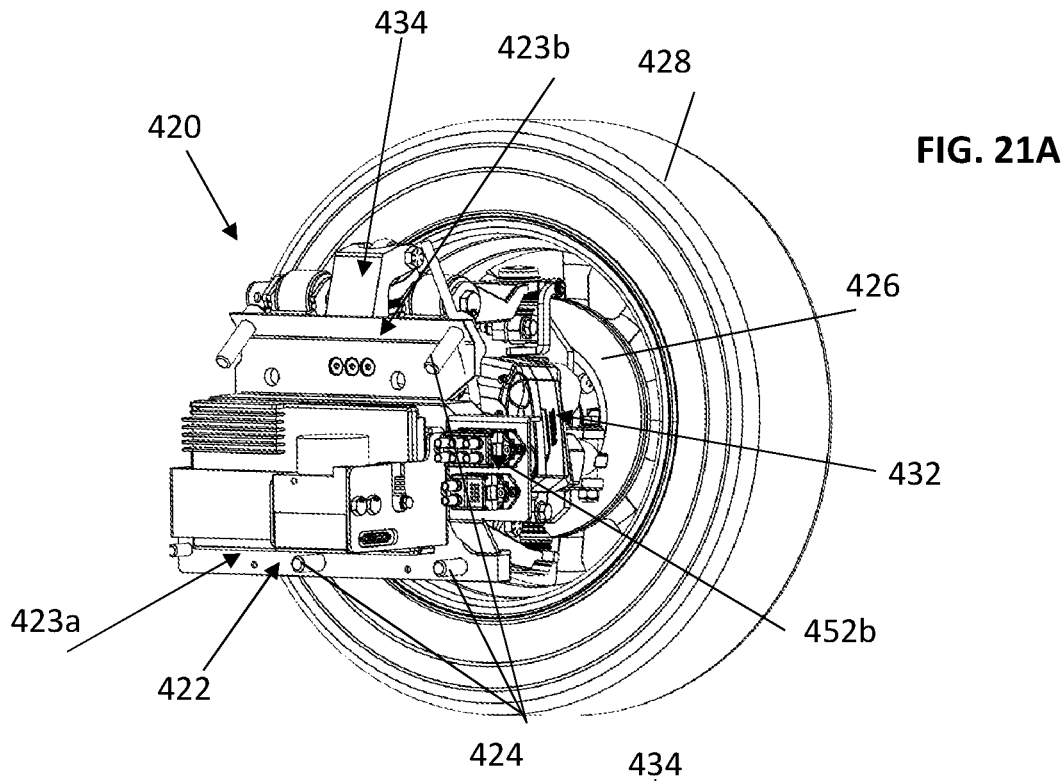
FIGS. 21A and 21B are, respectively, a perspective view illustration and a planar back view illustration of a VCM according to yet another embodiment of the disclosed technology.
Figure 21B:
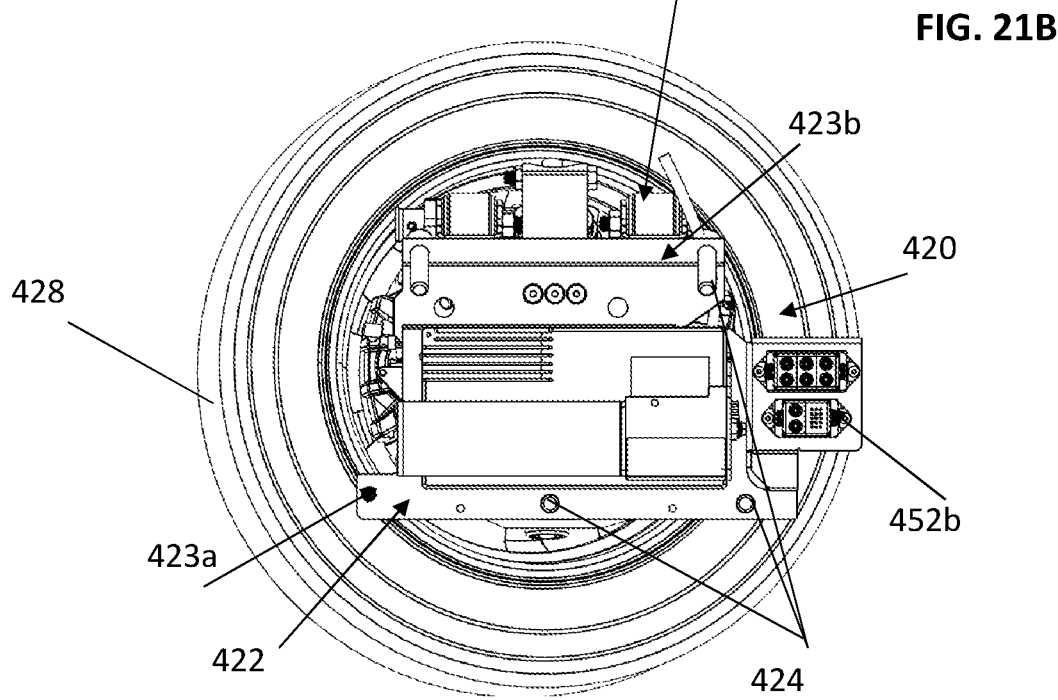
Figure 22:
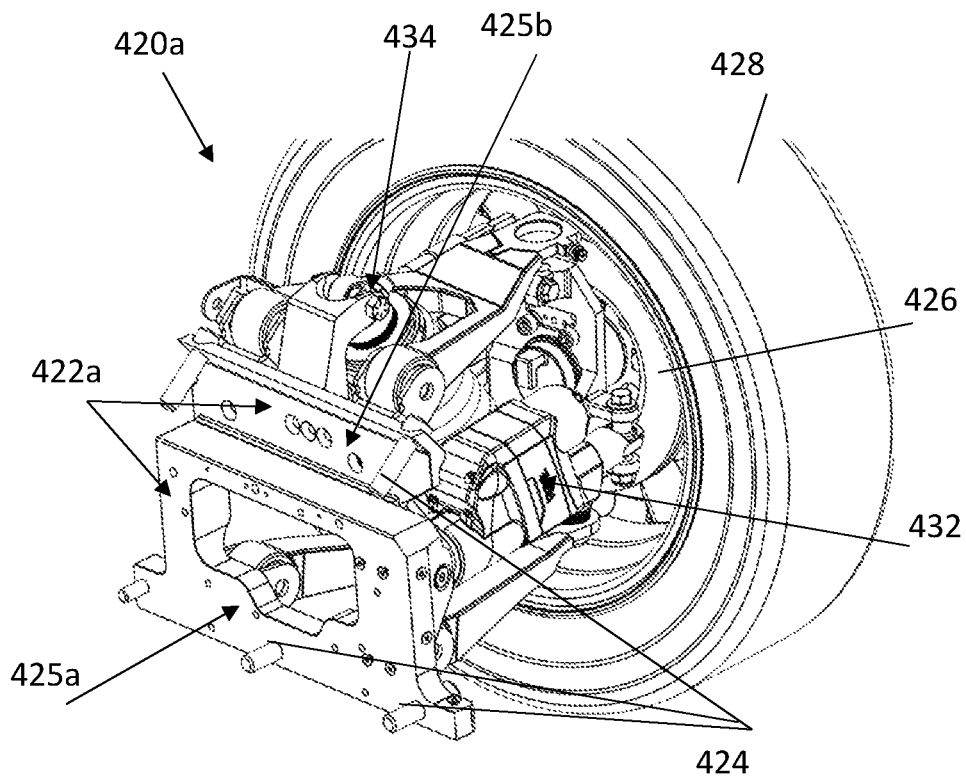
FIG. 22 is a perspective view illustration of the VCM similar to the VCM of FIGS. 21A and 21B, and having a similar sub-frame structure to the VCM of FIGS. 21A and 21B.

Reference is now made to FIGS. 21A and 21B, which are, respectively, a perspective view illustration and a planar back view illustration of a VCM 420 according to yet another embodiment of the disclosed technology. Reference is additionally made to FIG. 22 is a perspective view illustration of the VCM 420a similar to VCM 420 of FIGS. 21A and 21B, and having different subsystems and sub-frame structure than VCM 420. In the context of the following description, the 'front' of the VCM is the portion thereof on which the wheel is mounted, and the 'back' of the VCM is the portion thereof distal to the wheel.

As seen in FIGS. 21A and 21B, VCM 420 includes sub-frame 422, having a plurality of fasteners 424 extending therefrom, the fasteners forming the vehicle-connection interface of VCM 420. In VCM 420, sub-frame 422 includes a generally planar lower portion 423a and an upper portion 423b.

Turning to FIG. 22, it is seen that VCM 420a includes a sub-frame 422a, also having a plurality of fasteners 424 extending therefrom, the fasteners forming the vehicle-connection interface of VCM 420a. In VCM 420a, sub-frame 422a includes a back portion 425a and an upper portion 425b, similar to upper portion 423a of VCM 423.

It is appreciated that the fasteners 424 of VCMs 420 and 420a are substantially identical in structure, and are located at substantially the same distance from one another. As such, VCMs 420 and 420a have the same vehicle-connection interface, and may be interchangeably connected to a reference frame of a vehicle platform.

Each of VCMs 420 and 420a includes a wheel-hub assembly 426, illustrated with wheel 428 mounted thereon.

As seen clearly in FIGS. 21b and 22, all the fasteners 424 are within a cylindrical footprint of wheel 428, and as such, the entire vehicle-connection interface of each of VCMs 420 and 420a is within the cylindrical footprint of the wheel.

A suspension subsystem 434 is attached to wheel-hub assembly 426 as well as to each of sub-frames 422 and 422a. A braking subassembly (not explicitly shown) may also be attached to each of sub-frames 422 and 422a. A steering subassembly 432, which typically includes an actuator 442 and a steering rod 444, is attached to each of sub-frames 422 and 422a. VCMs 420 and 420a are devoid of a drive subassembly.

As seen in FIGS. 21A and 21B, a VCM-portion 452b of a multi-interface connection-element which may be similar to the multi-interface connection-element described hereinabove with respect to FIGS. 2 to 5 is connected to sub-frame 422. Though the VCM-portion 452b is not shown in VCM 420a, it is appreciated that VCM 420a may also be connectable using a multi-interface connection-element.

As seen in FIG. 22, in VCMs 420 and 420a, the suspension subsystem 434 and the steering subsystem 432, and in some embodiments, also the braking subsystem (not explicitly shown), are all disposed between sub-frame 422 and wheel-hub assembly 426.

Figure 23:
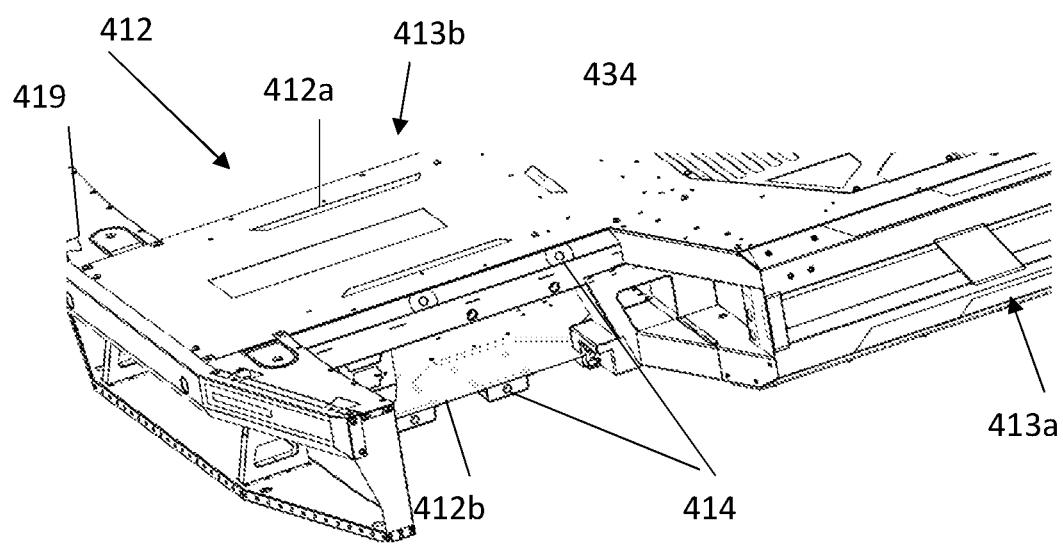
FIG. 23 is a perspective view illustration of a reference-frame of a vehicle platform, including a VCM-connection interface for connection to the VCM of FIGS. 21A to 22.

Reference is now made to FIG. 23, which is a perspective cut view illustration of a rear or a front portion of a vehicle reference-frame 412 adapted for connection to VCMs 420 and 420a of FIGS. 21A to 22. As seen in FIG. 23, either of the rear/front portions of reference frame 412 has an upper surface 412a and a lower surface 412b. Reference frame 412 is divided into a central portion 413a, and a VCM-receiving portion 413b, which can be either a rear or a front portion, optionally terminating in a bumper 419. A plurality of bores 414 are formed in side walls of VCM-receiving portion 413b, transversely to the upper and lower surfaces, thereby forming a VCM-connection interface for connection to VCMs 420 or 420a. In some embodiments, at least some of bores 414 may be perpendicular to the upper and/or lower surfaces. In some embodiments, at least some of bores 414 are not perpendicular to the upper and/or lower surfaces, but rather are angled relative to the upper and/or lower surfaces at an angle suitable to receive the fasteners 424 of sub-frame 422.

In some embodiments, fasteners 424 may be replaced by a corresponding plurality of prongs, which are adapted to be received within bores 414 and held therein by additional fasteners, not explicitly shown.

For connection of VCM 420 or 420a to reference frame 412, the VCM is aligned with VCM-receiving portion 413b such that fasteners 424 are aligned with bores 414. The VCM is then moved laterally toward reference frame 412, without changing the vertical alignment of the VCM, until fasteners 424 engage, and are inserted into, bores 414. In some embodiments, fasteners may be used to reinforce connection of fasteners 424 within bores 414.

In some embodiments, in the attached configuration, some portions of the VCM may be disposed between the upper and lower surfaces of reference frame 412, for example within hollow 415. In some embodiments, a vehicle-platform-portion of the multi-interface connection-element, corresponding to VCM-portion 452b, may be mounted on reference frame 412, for example on a side wall 417 connecting the upper and lower surfaces.

Reference is now made to FIGS. 24A and 24B, which are photographs of a VCM 520 connected to a reference-frame 512 of a vehicle platform 510 according to still another embodiment of the disclosed technology.

As seen in FIGS. 24A and 24B, reference-frame 512 includes an upper surface 512a, and a VCM-connection portion 513 extending upwardly from upper surface. VCM-connection interface of reference-frame 512 comprises a plurality of bores 514 formed in VCM-connection portion 513.

VCM 520 includes a sub-frame 522, including a vehicle-connection interface formed of a corresponding plurality of bores, adapted to be aligned with bores 514 when sub-frame 522 is seated within the hollow space of vehicle-connection portion 513. In use, sub-frame 522 of VCM 520 is connected to reference frame 512 by aligning the sub-frame at the height of vehicle-connection portion 513, and then moving sub-frame 522 laterally, without changing the height of bores 524, until bores 524 are aligned with bores 514 of reference frame 512. At this stage, fasteners 529 are inserted into aligned bores 514 and 524, to hold the connection between the reference-frame and the sub-frame.

In some embodiments, bores 514 and/or 524 may be larger in at least one direction than fasteners 529, as seen in FIG. 24B. In such embodiments, the connection of VCM 520 to reference frame 512 is configurable, for example to control or configure any one of the caster angle of the wheel, the camber angle of the wheel, and the toe angle of the wheel.

As seen in FIG. 24A, sub-frame 522 includes a wheel-hub assembly 526, having mounted thereon a wheel 528. The entirety of vehicle-connection portion 513, and of connection interfaces 514 and 524, is within the cylindrical footprint of wheel 528. Sub-frame 522 has mounted thereon a suspension subsystem 534, and a steering subsystem 532, which may be disposed partially within wheel 528.

In some embodiments, a VCM-portion (not shown) of a multi-interface connection-element (FIG. 2) may be mounted onto sub-frame 522, and the corresponding vehicle-platform-portion may be mounted onto vehicle-connection portion 513. In such embodiments, when connecting VCM 520 to reference-frame 512, the VCM-portion is adapted to be connected to the vehicle-platform-portion of the multi-interface connection-element, as described hereinabove with respect to FIGS. 2 to 5.

The present invention can be described by the following aspects:

1. A vehicle corner module (VCM) connectable to a VCM-connection interface of a reference-frame of a vehicle platform, for regulating motion of a vehicle, the VCM including:
   a sub-frame including a vehicle-connection interface for reversible mechanical connection of the VCM to the VCM-connection interface of the reference frame;
   a wheel-hub assembly including a wheel-hub adapted for mounting of a wheel thereon; and
   at least one subsystem of the vehicle, mounted onto the sub-frame, the at least one subsystem being selected from the group of subsystems consisting of a drive subsystem, a steering subsystem, a suspension subsystem, and a braking subsystem,
   wherein, when a wheel is mounted on the wheel-hub assembly, the vehicle-connection interface is disposed within a cylindrical footprint of the wheel, and
   wherein at least one of the at least one subsystem is accommodated between the wheel-hub assembly and the vehicle-connection interface.

2. The VCM of aspect 1, wherein, when the sub-frame is connected to the reference-frame by engagement of the vehicle-connection interface with the VCM-connection interface, the vehicle-connection interface is disposed between the wheel and the reference-frame.

3. The VCM of aspect 1 or aspect 2, wherein, when the sub-frame is connected to the reference-frame by engagement of the vehicle-connection interface with the VCM-connection interface, the vehicle-connection interface is disposed at a height between a height of an upper surface of the reference-frame and a height of a lower surface of the reference-frame.

4. The VCM of any one of aspects 1 to 3, wherein the vehicle further includes at least one power supply, and wherein the VCM further includes at least one connector for connection to the at least one power supply, such that, when the VCM is connected to the vehicle, the at least one power supply powers the at least one subsystem.

5. The VCM of any one of aspects 1 to 4, wherein:
the at least one subsystem includes at least one of:
a subsystem disposed between the wheel-hub assembly and the vehicle-connection interface; and
a subsystem mounted onto a portion of the sub-frame adapted, when the sub-frame is connected to the reference-frame, to be disposed within the reference frame, between upper and lower surfaces of the reference frame.

6. The VCM of any one of aspects 1 to 4, wherein all of the subsystems in the plurality of subsystems are disposed between the wheel-hub assembly and the vehicle-connection interface.

7. The VCM of any one of aspects 1 to 6, wherein connection of the sub-frame to the reference-frame by engagement of the vehicle-connection interface with the VCM-connection interface is carried out when the vehicle-connection interface of the VCM is disposed at a height of the reference-frame.

8. The VCM of any one of aspects 1 to 7, wherein the VCM-connection interface includes a bar extending from the reference-frame in a direction parallel to a longitudinal axis of the reference-frame, and the vehicle-connection interface includes a clamp adapted to be clamped onto the bar, thereby to connect the VCM to the vehicle.

9. The VCM of aspect 8, wherein clamping of the clamp about the bar is adapted to be reinforced by at least one fastener.

10. The VCM of aspect 8 or aspect 9, wherein the clamp is slidable onto the bar.

11. The VCM of any one of aspects 8 to 10, wherein the bar extends between the reference frame and a bumper of the vehicle platform.

12. The VCM of aspect 11, wherein the clamp is mounted onto the bar prior to installation of the bumper, such that installation of the bumper reinforces the connection of the VCM to the vehicle platform.

13. The VCM of any one of aspects 1 to 12, wherein the sub-frame is adapted for attachment to a flat reference-frame which is devoid of raised connection portions disposed above an upper surface of the reference-frame or below a lower surface of the reference-frame.

14. The VCM of any one of aspects 1 to 13, wherein the sub-frame includes a second connection interface, adapted for connection to a vehicle assembly coupled to the reference-frame.

15. The VCM of aspect 14, wherein the vehicle assembly includes a top-hat frame of the vehicle, which is adapted to envelop the wheel.

16. The VCM of any one of aspects 1 to 15, wherein the vehicle-connection interface includes a plurality of fasteners adapted for fastening the VCM to corresponding bores forming part of the VCM-connection interface of the reference-frame.

17. The VCM of any one of aspects 1 to 16, wherein the vehicle-connection interface is adapted for snap-fit engagement with the VCM-connection interface of the reference-frame.

18. The VCM of any one of aspects 1 to 17, wherein the at least one subsystem includes a suspension subsystem, disposed between the wheel-hub assembly and the vehicle-connection interface.

19. The VCM of any one of aspects 1 to 18, wherein the VCM is devoid of a steering subsystem, and includes a drive subsystem.

20. The VCM of any one of aspects 1 to 18, wherein the VCM is devoid of a drive subsystem, and includes a steering subsystem.

21. The VCM of any one of aspects 1 to 20, wherein at least one of camber, caster, and toe angle of the wheel is adjustable by making adjustments to the engagement between the vehicle-connection interface and the VCM-connection interface, when the VCM is connected to the vehicle platform.

22. The VCM of any one of aspects 1 to 21, further including a VCM-portion of a multi-interface connection-element, mounted onto the sub-frame and adapted for connection to a vehicle-platform-portion of the multi-interface connection-element, the vehicle-platform-portion being mounted onto the reference-frame of the vehicle platform and connected to multiple electronic or flow subsystems of the vehicle,
wherein the VCM-portion of the multi-interface connection-element includes multiple connection interfaces for connection of the VCM-portion to the vehicle-platform-portion, thereby to connect the VCM to each of the multiple electronic subsystems of the vehicle, and
wherein each of the multiple electronic or flow subsystems is selected from the group consisting of a power supply of the vehicle, a control-circuit of the vehicle, a computerized controller of the vehicle, a network bus of the vehicle, a network interface of the vehicle, a coolant flow subsystem of the vehicle, an oil flow subsystem of the vehicle, and a brake-fluid flow subsystem of the vehicle.

23. A vehicle corner module (VCM) connectable to a VCM-connection interface of a reference-frame of a vehicle platform, for regulating motion of a vehicle, the VCM including:
a sub-frame including a vehicle-connection interface for reversible mechanical connection of the VCM to the VCM-connection interface of the reference frame;
a wheel-hub assembly including a wheel-hub adapted for mounting of a wheel thereon; and
at least one subsystem of the vehicle, mounted onto the sub-frame, the at least one subsystem being selected from the group of subsystems consisting of a drive subsystem, a steering subsystem, a suspension subsystem, and a braking subsystem,
wherein, when a wheel is mounted on the wheel-hub assembly, the vehicle-connection interface is disposed within a cylindrical footprint of the wheel, and
wherein, when the sub-frame is connected to the reference-frame by engagement of the vehicle-connection interface with the VCM-connection interface, the vehicle-connection interface is disposed at a height between a height of an upper surface of the reference-frame and a height of a lower surface of the reference-frame.

24. The VCM of aspect 23, wherein at least one of the at least one subsystem is accommodated between the wheel-hub assembly and the vehicle-connection interface.

25. The VCM of aspect 23 or aspect 24, wherein, when the sub-frame is connected to the reference-frame by engagement of the vehicle-connection interface with the VCM-connection interface, the vehicle-connection interface is disposed between the wheel and the reference-frame.

26. The VCM of any one of aspects 23 to 25, wherein the vehicle further includes at least one power supply, and wherein the VCM further includes at least one connector for connection to the at least one power supply, such that, when the VCM is connected to the vehicle, the at least one power supply powers the at least one subsystem.

27. The VCM of any one of aspects 23 to 26, wherein: the at least one subsystem includes at least one of:
   a subsystem disposed between the wheel-hub assembly and the vehicle-connection interface; and
   a subsystem mounted onto a portion of the sub-frame adapted, when the sub-frame is connected to the reference-frame, to be disposed within the reference frame, between upper and lower surfaces of the reference frame.

28. The VCM of any one of aspects 23 to 26, wherein all of the subsystems in the plurality of subsystems are disposed between the wheel-hub assembly and the vehicle-connection interface.

29. The VCM of any one of aspects 23 to 28, wherein connection of the sub-frame to the reference-frame by engagement of the vehicle-connection interface with the VCM-connection interface is carried out when the vehicle-connection interface of the VCM is disposed at a height of the reference-frame.

30. The VCM of any one of aspects 23 to 29, wherein the VCM-connection interface includes a bar extending from the reference-frame in a direction parallel to a longitudinal axis of the reference-frame, and the vehicle-connection interface includes a clamp adapted to be clamped onto the bar, thereby to connect the VCM to the vehicle.

31. The VCM of aspect 30, wherein clamping of the clamp about the bar is adapted to be reinforced by at least one fastener.

32. The VCM of aspect 30 or aspect 31, wherein the clamp is slidable onto the bar.

33. The VCM of any one of aspects 30 to 32, wherein the bar extends between the reference frame and a bumper of the vehicle platform.

34. The VCM of aspect 33, wherein the clamp is slidable onto the bar prior to installation of the bumper, such that installation of the bumper reinforces the connection of the VCM to the vehicle platform.

35. The VCM of any one of aspects 23 to 34, wherein the sub-frame is adapted for attachment to a flat reference-frame which is devoid of raised connection portions disposed above an upper surface of the reference frame or below a lower surface of the reference frame.

36. The VCM of any one of aspects 23 to 35, wherein the sub-frame includes a second connection interface, adapted for connection to a vehicle assembly coupled to the reference frame.

37. The VCM of aspect 36, wherein the vehicle assembly includes a top-hat frame of the vehicle, which is adapted to envelop the wheel.

38. The VCM of any one of aspects 23 to 37, wherein the vehicle-connection interface includes a plurality of fasteners adapted for fastening the VCM to corresponding bores forming part of the VCM-connection interface of the reference-frame.

39. The VCM of any one of aspects 23 to 38, wherein the vehicle-connection interface is adapted for snap-fit engagement with the VCM-connection interface of the reference-frame.

40. The VCM of any one of aspects 23 to 39, wherein the at least one subsystem includes a suspension subsystem, disposed between the wheel-hub assembly and the vehicle-connection interface.

41. The VCM of any one of aspects 23 to 40, wherein the VCM is devoid of a steering subsystem, and includes a drive subsystem.

42. The VCM of any one of aspects 23 to 40, wherein the VCM is devoid of a drive subsystem, and includes a steering subsystem.

43. The VCM of any one of aspects 23 to 42, wherein at least one of camber, caster, and toe angle of the wheel is adjustable by making adjustments to the engagement between the vehicle-connection interface and the VCM-connection interface, when the VCM is connected to the vehicle platform.

44. The VCM of any one of aspects 23 to 43, further including a VCM-portion of a multi-interface connection-element, mounted onto the sub-frame and adapted for connection to a vehicle-platform-portion of the multi-interface connection-element, the vehicle-platform-portion being mounted onto the reference-frame of the vehicle platform and connected to multiple electronic or flow subsystems of the vehicle,
   wherein the VCM-portion of the multi-interface connection-element includes multiple connection interfaces for connection of the VCM-portion to the vehicle-platform-portion, thereby to connect the VCM to each of the multiple electronic subsystems of the vehicle, and
   wherein each of the multiple electronic or flow subsystems is selected from the group consisting of a power supply of the vehicle, a control-circuit of the vehicle, a computerized controller of the vehicle, a network bus of the vehicle, a network interface of the vehicle, a coolant flow subsystem of the vehicle, an oil flow subsystem of the vehicle, and a brake-fluid flow subsystem of the vehicle.

45. A vehicle platform of a vehicle, adapted for connection to at least one Vehicle Corner Module (VCM) adapted to regulate motion of the vehicle, the vehicle platform including a reference frame including:
   an upper surface and a lower surface; and
   at least one bar, forming a VCM-connection interface adapted to have a clamp of the VCM mounted thereon for reversible mechanical connection of the VCM to the reference frame.

46. The vehicle platform of aspect 45, wherein the bar is sized and configured for slidable mounting of the VCM thereonto.

47. The vehicle platform of aspect 45 or aspect 46, further including at least one bumper, mounted onto the reference frame, distal to the bar.
48. The vehicle platform of aspect 47, wherein the bar engages both the reference frame and the bumper.
49. The vehicle platform of aspect 47, wherein the bar engages the reference frame and extends from the reference frame towards the bumper, without engaging the bumper.
50. The vehicle platform of any one of aspects 45 to 49, further including a vehicle-platform-portion of a multi-interface connection-element, mounted onto the reference frame and connected to multiple electronic or flow subsystems of the vehicle, the vehicle-platform-portion being adapted for connection to a VCM-portion of the multi-interface connection-element, the VCM-portion being mounted onto a sub-frame of the VCM,
  wherein the vehicle-platform-portion of the multi-interface connection-element includes multiple connection interfaces for connection of the vehicle-platform-portion to the VCM-portion, thereby to connect the VCM to each of the multiple electronic subsystems of the vehicle, and
  wherein each of the multiple electronic or flow subsystems is selected from the group consisting of a power supply of the vehicle, a control-circuit of the vehicle, a computerized controller of the vehicle, a network bus of the vehicle, a network interface of the vehicle, a coolant flow subsystem of the vehicle, an oil flow subsystem of the vehicle, and a brake-fluid flow subsystem of the vehicle.
51. A vehicle including:
  a vehicle platform including a reference frame having an upper surface and a lower surface, the reference frame including at least one VCM-connection interface;
  at least one vehicle corner module (VCM) connected to a VCM-connection interface of the reference-frame, the at least one VCM adapted for regulating motion of the vehicle, the VCM including:
    a sub-frame including a vehicle-connection interface reversibly and mechanically engaging the VCM-connection interface of the reference frame;
    a wheel-hub assembly including a wheel-hub adapted for mounting of a wheel thereon; and
    at least one subsystem of the vehicle, mounted onto the sub-frame, the at least one subsystem being selected from the group of subsystems consisting of a drive subsystem, a steering subsystem, a suspension subsystem, and a braking subsystem,
  wherein, when a wheel is mounted on the wheel-hub assembly, the vehicle-connection interface and the VCM-connection interface are accommodated within a cylindrical footprint of the wheel.
52. The vehicle of aspect 51, wherein the vehicle-connection interface of the sub-frame is reversibly and mechanically connected to the VCM-connection interface of the reference frame.
53. The vehicle of aspect 51 or aspect 52, wherein the vehicle-connection interface and the VCM-connection interface are disposed at a height between a height of the upper surface of the reference-frame and a height of the lower surface of the reference-frame.
54. The vehicle of any one of aspects 51 to 53, wherein at least one of the at least one subsystem is accommodated between the wheel-hub assembly and the vehicle-connection interface.
55. The vehicle of any one of aspects 51 to 54, wherein the vehicle-connection interface is disposed between the wheel and the reference-frame.
56. The vehicle of any one of aspects 51 to 55, further including at least one power supply, the VCM being connected to the at least one power supply such that the at least one power supply powers the at least one subsystem.
57. The vehicle of any one of aspects 51 to 56, wherein:
  the at least one subsystem includes at least one of:
    a subsystem disposed between the wheel-hub assembly and the vehicle-connection interface; and
    a subsystem mounted onto a portion of the sub-frame disposed within the reference frame, between upper and lower surfaces of the reference frame.
58. The vehicle of any one of aspects 51 to 56, wherein all of the subsystems in the plurality of subsystems are disposed between the wheel-hub assembly and the vehicle-connection interface.
59. The vehicle of any one of aspects 51 to 58, the sub-frame is connected to the reference-frame when the vehicle-connection interface of the VCM is disposed at a height of the reference-frame.
60. The vehicle of any one of aspects 51 to 59, wherein the VCM-connection interface includes a bar extending from the reference-frame in a direction parallel to a longitudinal axis of the reference-frame, and the vehicle-connection interface includes a clamp clamped onto the bar, thereby connecting the VCM to the reference-frame.
61. The vehicle of aspect 60, wherein clamping of the clamp about the bar is adapted to be reinforced by at least one fastener.
62. The vehicle of aspect 60 or aspect 61, wherein the clamp is slidable onto the bar.
63. The vehicle of any one of aspects 60 to 62, wherein the vehicle platform further includes a bumper, and the bar extends between the reference frame and the bumper.
64. The vehicle of aspect 63, wherein the clamp is slidable onto the bar prior to installation of the bumper, such that installation of the bumper reinforces the connection of the VCM to the vehicle platform.
65. The vehicle of any one of aspects 51 to 64, wherein the reference-frame is flat and is devoid of raised connection portions disposed above an upper surface of the reference frame or below a lower surface of the reference frame.
66. The vehicle of any one of aspects 51 to 65, wherein:
  the vehicle platform includes a vehicle assembly coupled to the reference frame; and
  the sub-frame includes a second connection interface, connected to the vehicle assembly.
67. The vehicle of aspect 66, wherein the vehicle assembly includes a top-hat frame enveloping the wheel.
68. The vehicle of any one of aspects 51 to 67, wherein the vehicle-connection interface includes a plurality of fasteners fastening the VCM to corresponding bores forming part of the VCM-connection interface of the reference-frame.
69. The vehicle of any one of aspects 51 to 68, wherein the vehicle-connection interface engages the VCM-connection interface of the reference-frame by snap-fit engagement.
70. The vehicle of any one of aspects 51 to 69, wherein the at least one subsystem includes a suspension subsystem, disposed between the wheel-hub assembly and the vehicle-connection interface.
71. The vehicle of any one of aspects 51 to 70, wherein the VCM is devoid of a steering subsystem, and includes a drive subsystem.
72. The vehicle of any one of aspects 51 to 70, wherein the VCM is devoid of a drive subsystem, and includes a steering subsystem.
73. The vehicle of any one of aspects 51 to 72, wherein at least one of camber, caster, and toe angle of the wheel is adjustable by adjusting the engagement between the vehicle-connection interface and the VCM-connection interface.
74. The vehicle of any one of aspects 51 to 73, further including:
multiple electronic or flow subsystems, each selected from the subsystem group consisting of a power supply, a control-circuit, a computerized controller, a network bus, a network interface, a coolant flow subsystem, an oil flow subsystem, and a brake fluid flow subsystem; and
a multi-interface connection-element including a VCM-portion mounted onto the sub-frame, reversibly connected to a corresponding vehicle-platform-portion mounted onto the reference-frame and connected to the multiple electronic or flow subsystems, each of the VCM-portion and the vehicle-platform-portion including multiple connection interfaces for connection to the other of the VCM-portion and the vehicle-platform-portion,
wherein, connection of the VCM-portion to the vehicle-platform-portion of the multi-interface connection-element result in connection of the VCM to the multiple electronic or flow subsystems.
75. The vehicle of aspect 74, wherein for each electronic or flow subsystem of the multiple electronic or flow subsystems, one of the VCM-portion and vehicle-platform-portion of the multi-interface connection-element includes a port, and the other of the VCM-portion and vehicle-platform-portion includes a corresponding plug, which, when the first and second portions are connected, is received in the port to connect the VCM to the electronic or flow subsystem.
76. A vehicle corner module (VCM) connectable to a VCM-connection interface of a reference-frame of a vehicle platform, the reference-frame having mounted thereon a vehicle-platform-portion of a multi-interface connection-element, the vehicle-platform-portion including multiple connection interfaces, each connected to one of multiple electronic or flow subsystems of the vehicle, the VCM including:
a sub-frame including a vehicle-connection interface for reversible mechanical connection of the VCM to the VCM-connection interface of the reference frame;
a wheel-hub assembly including a wheel-hub adapted for mounting of a wheel thereon;
at least one subsystem of the vehicle, mounted onto the sub-frame, the at least one subsystem being selected from the group of subsystems consisting of a drive subsystem, a steering subsystem, a suspension subsystem, and a braking subsystem; and
a VCM-portion of the multi-interface connection-element mounted onto the sub-frame, the VCM-portion being connectable to the vehicle-platform-portion of the multi-interface connection-element and including multiple corresponding connection interfaces for connection to connection interfaces of the vehicle-platform-portion,
wherein, connection of the VCM-portion to the vehicle-platform-portion of the multi-interface connection-element results in connection of the VCM to the multiple electronic or flow subsystems.
77. The VCM of aspect 76, wherein each of the multiple corresponding connection interfaces is adapted for connection of the VCM to one of the multiple electronic or flow subsystems, each of which is selected from the subsystem group consisting of power supply of the vehicle, a control-circuit of the vehicle, a computerized controller of the vehicle, a network bus of the vehicle, a network interface of the vehicle, a coolant flow subsystem of the vehicle, an oil flow subsystem of the vehicle, and a brake-fluid flow subsystem of the vehicle.
78. The VCM of aspect 76 or aspect 77, wherein each of the multiple corresponding connector interfaces of the VCM-portion includes a plug adapted to be inserted into a port in the vehicle-platform-portion or a port adapted to receive a plug of the vehicle-platform-portion.
79. The VCM of any one of aspects 76 to 78, wherein, when a wheel is mounted on the wheel-hub assembly, the vehicle-connection interface is disposed within a cylindrical footprint of the wheel.
80. The VCM of any one of aspects 76 to 79, wherein at least one of the at least one subsystem is accommodated between the wheel-hub assembly and the vehicle-connection interface.
81. The VCM of any one of aspects 76 to 80, wherein, when the sub-frame is connected to the reference-frame by engagement of the vehicle-connection interface with the VCM-connection interface, the vehicle-connection interface is disposed between the wheel and the reference-frame.
82. The VCM of any one of aspects 76 to 81, wherein, when the sub-frame is connected to the reference-frame by engagement of the vehicle-connection interface with the VCM-connection interface, the vehicle-connection interface is disposed at a height between a height of an upper surface of the reference-frame and a height of a lower surface of the reference-frame.
83. The VCM of any one of aspects 76 to 82, wherein the vehicle further includes at least one power supply, and wherein the VCM further includes at least one connector for connection to the at least one power supply, such that, when the VCM is connected to the vehicle, the at least one power supply powers the at least one subsystem.
84. The VCM of any one of aspects 76 to 83, wherein:
the at least one subsystem includes at least one of:
a subsystem disposed between the wheel-hub assembly and the vehicle-connection interface; and
a subsystem mounted onto a portion of the sub-frame adapted, when the sub-frame is connected to the reference-frame, to be disposed within the reference frame, between upper and lower surfaces of the reference frame.
85. The VCM of any one of aspects 76 to 83, wherein all of the subsystems in the plurality of subsystems are disposed between the wheel-hub assembly and the vehicle-connection interface.
86. The VCM of any one of aspects 76 to 85, wherein connection of the sub-frame to the reference-frame by engagement of the vehicle-connection interface with the VCM-connection interface is carried out when the vehicle-connection interface of the VCM is disposed at a height of the reference-frame.
87. The VCM of any one of aspects 76 to 86, wherein the VCM-connection interface includes a bar extending from the reference-frame in a direction parallel to a longitudinal axis of the reference-frame, and the vehicle-connection interface includes a clamp adapted to be clamped onto the bar, thereby to connect the VCM to the vehicle.
88. The VCM of aspect 87, wherein clamping of the clamp about the bar is adapted to be reinforced by at least one fastener.
89. The VCM of aspect 87 or aspect 88, wherein the clamp is slidable onto the bar.
90. The VCM of any one of aspects 87 to 89, wherein the bar extends between the reference frame and a bumper of the vehicle platform.
91. The VCM of any one of aspects 76 to 90, wherein the sub-frame is adapted for attachment to a flat reference-frame which is devoid of raised connection portions disposed above an upper surface of the reference-frame or below a lower surface of the reference-frame.
92. The VCM of any one of aspects 76 to 91, wherein the sub-frame includes a second connection interface, adapted for connection to a vehicle assembly coupled to the reference frame.
93. The VCM of aspect 92, wherein the vehicle assembly includes a top-hat frame of the vehicle, which is adapted to envelop the wheel.
94. The VCM of any one of aspects 76 to 93, wherein the vehicle-connection interface includes a plurality of fasteners adapted for fastening the VCM to corresponding bores forming part of the VCM-connection interface of the reference-frame.
95. The VCM of any one of aspects 76 to 94, wherein the vehicle-connection interface is adapted for snap-fit engagement with the VCM-connection interface of the reference-frame.
96. The VCM of any one of aspects 76 to 95, wherein the at least one subsystem includes a suspension subsystem, disposed between the wheel-hub assembly and the vehicle-connection interface.
97. The VCM of any one of aspects 76 to 96, wherein the VCM is devoid of a steering subsystem, and includes a drive subsystem.
98. The VCM of any one of aspects 76 to 96, wherein the VCM is devoid of a drive subsystem, and includes a steering subsystem.
99. The VCM of any one of aspects 76 to 98, wherein at least one of camber, caster, and toe angle of the wheel is adjustable by making adjustments to the engagement between the vehicle-connection interface and the VCM-connection interface, when the VCM is connected to the vehicle platform.
100. A method for installing a Vehicle Corner Module (VCM) on a vehicle platform of a vehicle, the method including:
aligning a vehicle-connection interface of a sub-frame of the VCM with a reference-frame of the vehicle-platform, such that the vehicle-connection interface is disposed between upper and lower surfaces of the reference frame; and
without changing the height alignment between the vehicle-connection interface of the VCM and the reference-frame, mechanically connect the at least one VCM to the reference-frame by engagement of the vehicle-connection interface with a VCM-connection interface of the reference frame.
101. The method of aspect 100, further including connecting the VCM to multiple electronic or flow subsystems of the vehicle by connecting a VCM-portion of a multi-interface connection-element, mounted on the sub-frame, to a vehicle-platform portion of the multi-interface connection-element, forming part of the vehicle platform.
102. The method of aspect 101, wherein each of the multiple electronic and/or flow subsystems is selected from the subsystem group consisting of a power supply, a control-circuit, a computerized controller, a network bus, a network interface, a coolant flow subsystem, an oil flow subsystem, and a brake-fluid flow subsystem.
103. The method of any one of aspects 100 to 102, wherein the mechanically connecting includes pushing the VCM laterally, in a direction perpendicular to a longitudinal axis of the reference-frame, for the vehicle-connection interface to engage the VCM-connection interface.
104. The method of any one of aspects 100 to 102, wherein the mechanically connecting includes pushing the VCM longitudinally, in a direction parallel to a longitudinal axis of the reference-frame, for the vehicle-connection interface to engage the VCM-connection interface.
105. The method of any one of aspects 100 to 104, wherein the mechanically connecting includes placing fasteners which engage the vehicle-connection interface and the VCM-connection interface.
106. The method of any one of aspects 100 to 105, wherein:
the VCM-connection interface includes a bar extending from the reference frame in a direction parallel to a longitudinal axis of the reference frame,
the vehicle-connection interface includes a clamp including an opening, the clamp adapted to be clamped onto the bar, and
the mechanically connecting includes mounting the clamp onto the bar.
107. The method of aspect 106, wherein the mounting of the clamp onto the bar includes sliding of the clamp onto the bar.
108. The method of aspect 107, further including connecting at least one bumper to the reference frame.
109. The method of aspect 108, wherein the connecting of the bumper occurs after the sliding of the clamp.
110. The method of aspect 108, wherein the connecting of the bumper occurs prior to the sliding of the clamp.
111. A multi-interface connection-element for connection of multiple electronic or flow vehicle subsystems of a vehicle to a Vehicle Corner Module (VCM) mounted onto a reference-frame of a vehicle platform of the vehicle, the VCM being adapted to regulate motion of the vehicle, the multi-interface connection-element including:
a vehicle-platform-portion mountable onto the reference frame of the vehicle, the vehicle-platform-portion including multiple connection interfaces, each adapted to be associated with one of the multiple electronic or flow vehicle subsystems;
a VCM-portion, mountable onto a sub-frame of the VCM, the VCM-portion including multiple corresponding connection interfaces adapted for connection to the multiple connection interfaces of the vehicle-platform-portion, wherein connection of the connection interfaces of the vehicle-platform-portion to the multiple corresponding connection interfaces of the VCM-portion results in connection of the VCM to the multiple electronic or flow subsystems.

112. The multi-interface connection-element of aspect 111, wherein each of the multiple electronic or flow subsystems is selected from the subsystem group consisting of: a power supply of the vehicle, a control-circuit of the vehicle, a computerized controller of the vehicle, a network bus of the vehicle, a network interface of the vehicle, a coolant flow subsystem of the vehicle, an oil flow subsystem of the vehicle, and a brake-fluid flow subsystem of the vehicle.

113. The multi-interface connection-element of aspect 111 or aspect 112, wherein connection of the connection interfaces of the vehicle-platform-portion to the multiple corresponding connection interfaces of the VCM-portion results in connection of at least one VCM-subsystem to at least one of the multiple electronic or flow subsystems.

114. The multi-interface connection-element of aspect 113, wherein the at least one VCM-subsystem includes at least one of a drive subsystem, a steering subsystem, a braking subsystem, a suspension subsystem, a VCM controller, and a cooling subsystem.

115. The multi-interface connection-element of any one of aspects 111 to 114, further including a motion actuator extending between a back portion of the VCM and a front portion of the VCM, and adapted to actuate motion of the VCM-portion relative to the vehicle-platform-portion for connection thereof.

116. The multi-interface connection-element of aspect 115, wherein the motion actuator is disposed at a different portion of the VCM than the VCM-portion, such that motion of the VCM-portion can be actuated even when the VCM-portion is inaccessible.

117. The multi-interface connection-element of aspect 115 or aspect 116, wherein the motion actuator includes a fastener connected to the VCM-portion by a connector cable, and wherein motion of the VCM-portion is actuated by operating the fastener to transfer movement actuation forces from the fastener to the VCM-portion.

118. The multi-interface connection-element of aspect 115 or aspect 116, wherein the motion actuator includes a fastener connected to the VCM-portion by a fluid-flow conduit, and wherein motion of the VCM-portion is actuated by transmitting a fluid through the fluid-flow conduit from the fastener to the VCM-portion.

119. The multi-interface connection-element of any one of aspects 115 to 118, wherein the motion actuator includes an electrical motor, adapted to be remotely operated by a remote controller.

120. The multi-interface connection-element of any one of aspects 111 to 119, wherein a connection-assembly connecting the VCM-portion to a sub-frame of the VCM includes at least one spring, adapted to apply force on VCM-portion toward the vehicle-platform-portion.

121. A method of connecting at least one VCM-subsystem mounted onto a Vehicle Corner Module (VCM) to at least one electronic or flow subsystem mounted onto a vehicle platform of a vehicle, the method including connecting a VCM-portion of a multi-interface connection-element, mounted on a sub-frame of the VCM and connected to the at least one VCM-subsystem, to a vehicle-platform-portion of the multi-interface connection-element forming part of the vehicle platform and connected to the at least one vehicle-subsystem, thereby to form a connection between the at least one VCM-subsystem and the at least one electronic or flow subsystem, wherein each of the VCM-portion and the vehicle-platform-portion of the multi-interface connection-element includes a plurality of connection interfaces, each associated with one of a plurality of electronic or flow subsystems.

122. The method of aspect 121, wherein each of the multiple electronic and/or flow subsystems is selected from the subsystem group consisting of a power supply, a control-circuit, a computerized controller, a network bus, a network interface, a coolant flow subsystem, an oil flow subsystem, and a brake-fluid flow subsystem.

123. The method of aspect 121 or aspect 122, wherein the connecting of the VCM-portion and the vehicle-platform-portion includes moving the VCM-portion relative to the vehicle-platform-portion until they are connected.

124. The method of aspect 123, wherein only one of the VCM-portion and the vehicle-platform-portion is movable, and the other is stationary.

125. The method of aspect 123 or aspect 124, wherein moving the VCM-portion relative to the vehicle-platform-portion includes actuating motion of the VCM-portion by a mechanical mechanism that extends between a back portion of the VCM and a front portion of the VCM.

126. The method of aspect 125, wherein the mechanical mechanism actuating motion of the VCM-portion is remote to the location of the VCM-portion.

127. The method of aspect 125 or aspect 126, wherein the mechanical mechanism includes a fastener connected to the VCM-portion by a connector cable, and wherein the actuating motion includes operating the connector fastener to transfer movement actuation forces from the fastener to the VCM-portion.

128. The method of aspect 125 or aspect 126, wherein the mechanical mechanism includes a fastener connected to the VCM-portion, and wherein actuating motion includes operating the fastener to transmit movement actuation forces to the VCM portion by fluid communication via the conduit.

129. The method of any one of aspects 121 to 124, wherein actuation of motion of at least one of the VCM-portion and the vehicle-platform portion is by an electrical motor.

130. The method of aspect 129, wherein the electrical motor is adapted to be remotely operated by a remote controller.

131. The method of any one of aspects 121 to 130, wherein the connecting is carried out from a front side of the VCM, regardless of the positioning of the VCM-connector within the VCM.

CONCLUDING COMMENT

All references cited herein are incorporated by reference in their entirety. Citation of a reference does not constitute an admission that the reference is prior art.

It is further noted that any of the embodiments described above may further include receiving, sending or storing instructions and/or data that implement the operations described above in conjunction with the figures upon a computer readable medium. Generally speaking, a computer readable medium (e.g. non-transitory medium) may include storage media or memory media such as magnetic or flash or optical media, e.g. disk or CD-ROM, volatile or non-volatile media such as RAM, ROM, etc.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A vehicle corner module (VCM) reversibly connectable to a reference-frame of a vehicle platform, for regulating motion of a vehicle, via a multi-interface connection element for connection of multiple electronic and/or flow vehicle subsystems of the vehicle to the VCM, the multi-interface connection-element having a vehicle-platform-portion mountable onto the reference frame of the vehicle, the VCM comprising:
   a sub-frame;
   a VCM-portion of the multi-interface connection-element, mounted onto the sub-frame and adapted for connection to the vehicle-platform-portion of the multi-interface connection-element;
   a motion actuator coupled to the VCM-portion of the multi-interface connection-element, the motion actuator adapted to actuate relative motion between the VCM-portion and the vehicle-platform-portion for connection therebetween;
   a wheel-hub assembly comprising a wheel-hub adapted for mounting of a wheel thereon; and
   at least one subsystem of the vehicle, mounted onto the sub-frame, the at least one subsystem being selected from the group of subsystems consisting of a drive subsystem, a steering subsystem, a suspension subsystem, and a braking subsystem.

2. The VCM of claim 1, wherein, when the sub-frame includes a vehicle-connection interface adapted for connection of the sub-frame to a VCM-connection interface forming part of the reference-frame.

3. The VCM of claim 2, wherein:
   the at least one subsystem comprises at least one of:
     a subsystem disposed between the wheel-hub assembly and the vehicle-connection interface; and
     a subsystem mounted onto a portion of the sub-frame adapted, when the sub-frame is connected to the reference-frame, to be disposed within the reference frame, between upper and lower surfaces of the reference frame.

4. The VCM of claim 2, wherein all of the subsystems in the plurality of subsystems are disposed between the wheel-hub assembly and the vehicle-connection interface.

5. The VCM of claim 1, wherein each of the multiple electronic and/or flow subsystems is selected from the group consisting of a power supply of the vehicle, a control-circuit of the vehicle, a computerized controller of the vehicle, a network bus of the vehicle, a network interface of the vehicle, a coolant flow subsystem of the vehicle, an oil flow subsystem of the vehicle, and a brake-fluid flow subsystem of the vehicle.

6. The VCM of claim 1, wherein each of the multiple electronic and/or flow subsystems comprises an electronic subsystem selected from the group consisting of a power supply of the vehicle, a control-circuit of the vehicle, a computerized controller of the vehicle, a network bus of the vehicle, and a network interface of the vehicle.

7. The VCM of claim 1, wherein each of the multiple electronic and/or flow subsystems comprises a flow subsystem selected from the group consisting of a coolant flow subsystem of the vehicle, an oil flow subsystem of the vehicle, and a brake-fluid flow subsystem of the vehicle.

8. A vehicle comprising:
   a vehicle platform including a reference frame;
   at least one vehicle corner module (VCM) connected to the reference-frame, the at least one VCM adapted for regulating motion of the vehicle, the VCM comprising:
     a sub-frame;
     a wheel-hub assembly comprising a wheel-hub adapted for mounting of a wheel thereon; and
     at least one subsystem of the vehicle, mounted onto the sub-frame, the at least one subsystem being selected from the group of subsystems consisting of a drive subsystem, a steering subsystem, a suspension subsystem, and a braking subsystem
   multiple electronic and/or flow subsystems, each selected from the subsystem group consisting of a power supply, a control-circuit, a computerized controller, a network bus, a network interface, a coolant flow subsystem, an oil flow subsystem, and a brake fluid flow subsystem;
   a multi-interface connection-element including:
     a vehicle-platform-portion mounted onto the reference-frame and connected to the multiple electronic and/or flow subsystems;
     a VCM-portion mounted onto the sub-frame, and reversibly connected to the vehicle-platform-portion; and
     a motion actuator adapted to actuate relative motion between the VCM-portion and the vehicle-platform-portion of the multi-interface connection-element for connection therebetween,
   wherein each of the VCM-portion and the vehicle-platform-portion includes multiple connection interfaces for connection to the other of the VCM-portion and the vehicle-platform-portion, and
   wherein, connection of the VCM-portion to the vehicle-platform-portion of the multi-interface connection-element result in connection of the VCM to the multiple electronic and/or flow subsystems.

9. The vehicle of claim 8, wherein sub-frame includes a vehicle-connection interface, the reference-frame includes a VCM-connection interface, and the vehicle-connection interface is reversibly and mechanically connected to the VCM-connection interface.

10. The vehicle of claim 8, wherein each of the multiple electronic and/or flow subsystems comprises an electronic subsystem selected from the group consisting of a power supply of the vehicle, a control-circuit of the vehicle, a computerized controller of the vehicle, a network bus of the vehicle, and a network interface of the vehicle.

11. The vehicle of claim 8, wherein each of the multiple electronic and/or flow subsystems comprises a flow subsystem selected from the group consisting of a coolant flow subsystem of the vehicle, an oil flow subsystem of the vehicle, and a brake-fluid flow subsystem of the vehicle.

12. The vehicle of claim 8, wherein the motion actuator extends between a back portion of the VCM and a front portion of the VCM.

13. The vehicle of claim 8, wherein the motion actuator is adapted to actuate motion of the VCM-portion toward the vehicle-platform-portion.

14. The vehicle of claim 8, wherein the motion actuator is adapted to actuate motion of the vehicle-platform-portion toward the VCM-portion.

15. A multi-interface connection-element for connection of multiple electronic and/or flow vehicle subsystems of a vehicle to a Vehicle Corner Module (VCM) mounted onto a reference-frame of a vehicle platform of the vehicle, the VCM being adapted to regulate motion of the vehicle, the multi-interface connection-element comprising:
- a vehicle-platform-portion mountable onto the reference frame of the vehicle, the vehicle-platform-portion comprising multiple connection interfaces, each adapted to be associated with one of the multiple electronic and/or flow vehicle subsystems;
- a VCM-portion, mountable onto a sub-frame of the VCM, the VCM-portion comprising multiple corresponding connection interfaces adapted for connection to the multiple connection interfaces of the vehicle-platform-portion; and
- a motion actuator adapted to actuate relative motion between the VCM-portion and the vehicle-platform-portion of the multi-interface connection-element for connection therebetween,
wherein connection of the connection interfaces of the vehicle-platform-portion to the multiple corresponding connection interfaces of the VCM-portion results in connection of the VCM to the multiple electronic and/or flow subsystems.

16. The multi-interface connection-element of claim 15, wherein connection of the connection interfaces of the vehicle-platform-portion to the multiple corresponding connection interfaces of the VCM-portion results in connection of at least one VCM-subsystem to at least one of the multiple electronic and/or flow subsystems.

17. The multi-interface connection-element of claim 15, wherein the motion actuator extends between a back portion of the VCM and a front portion of the VCM.

18. The multi-interface connection-element of claim 17, wherein the motion actuator is disposed at a different portion of the VCM than the VCM-portion, such that motion of the VCM-portion can be actuated even when the VCM-portion is inaccessible.

19. The multi-interface connection-element of claim 17, wherein the motion actuator comprises at least one of:
- a fastener connected to the VCM-portion by a connector cable, and wherein motion of the VCM-portion is actuated by operating the fastener to transfer movement actuation forces from the fastener to the VCM-portion; and
- a fastener connected to the VCM-portion by a fluid-flow conduit, and wherein motion of the VCM-portion is actuated by transmitting a fluid through the fluid-flow conduit from the fastener to the VCM-portion.

20. The multi-interface connection-element of claim 15, wherein the motion actuator includes an electrical motor, adapted to be remotely operated by a remote controller.

* * * * *